United States Patent [19]
Oka

[11] Patent Number: 6,091,945
[45] Date of Patent: Jul. 18, 2000

[54] AUTHENTICATION METHOD FOR RADIO COMMUNICATION SYSTEM, RADIO COMMUNICATION SYSTEM, RADIO COMMUNICATION TERMINAL AND COMMUNICATION MANAGING APPARATUS

[75] Inventor: Hiroyuki Oka, Tokyo, Japan

[73] Assignee: Sony Corporation, Tokyo, Japan

[21] Appl. No.: 08/824,274

[22] Filed: Mar. 26, 1997

[30] Foreign Application Priority Data

Mar. 29, 1996 [JP] Japan ................................ P08-077627

[51] Int. Cl.[7] ...................................... H04Q 7/24
[52] U.S. Cl. .......................... 455/411; 455/410; 455/550; 455/560
[58] Field of Search ..................... 455/410, 411, 455/403, 550, 560, 422, 445; 380/23

[56] References Cited

U.S. PATENT DOCUMENTS

| | | | |
|---|---|---|---|
| 4,955,049 | 9/1990 | Ghisler ..................................... | 455/410 |
| 5,091,942 | 2/1992 | Dent ..................................... | 455/411 X |
| 5,239,294 | 8/1993 | Flanders et al. ..................... | 455/411 X |
| 5,282,250 | 1/1994 | Dent ..................................... | 455/411 X |
| 5,457,737 | 10/1995 | Wen ........................................ | 455/410 |
| 5,553,315 | 9/1996 | Sobti et al. .............................. | 455/509 |
| 5,613,214 | 3/1997 | Shirasawa et al. ..................... | 455/411 |
| 5,734,981 | 3/1998 | Kennedy et al. ....................... | 455/445 |

Primary Examiner—William G. Trost
Attorney, Agent, or Firm—Jay H. Maioli

[57] ABSTRACT

In an authentication method for a radio communication system including a plurality of base stations, a plurality of radio communication terminals each capable of communicating with any one of the plurality of base stations, and a telephone network having a plurality of exchangers connected to the plurality of base stations and a communication managing apparatus capable of controlling the exchangers, each of the plurality of radio communication terminals has stored therein identification data different from the other radio communication terminals, The communication managing apparatus has stored therein identification data of the radio communication terminals permitted to access the radio communication system. When any of the radio communication terminals attempt a connection through the base station to the telephone network, it is examined whether or not the identification data stored in the radio communication terminal coincide with, any of the identification data which is stored in the communication managing apparatus and assigned to radio communication terminals permitted to access the telephone network. If it is confirmed that the identification data of both coincide with each other, the radio communication terminal is connected to the telephone network, and the identification data stored in the radio communication terminal and the communication managing apparatus are updated with new data at every connection made between the radio communication terminal and the telephone network.

32 Claims, 14 Drawing Sheets

AUTHENTICATION METHOD FOR RADIO COMMUNICATION SYSTEM, RADIO COMMUNICATION SYSTEM, RADIO COMMUNICATION TERMINAL AND COMMUNICATION MANAGING APPARATUS

BACKGROUND

1. Field of the Invention

The present invention relates to a communication method, a communication system, a communication terminal and a communication managing apparatus suitable for application to communication utilizing a radio communication terminals such as a portable telephone, mobile telephone, a portable information terminal or the like.

2. Background of the Invention

In a radio communication system using a radio communication terminal such as a portable radiophone, a mobile telephone, a portable information terminal or the like, each of the communication terminals carries out communication with a base station prepared on the side of communication network so as to connect to the communication network through the base station, whereby the communication terminal carries out communication with a desired opponent.

In this case, every communication terminal utilized in the communication system has set therein an identification number (so-called ID data) as an identical number of each terminal. Further, a communication managing center controlling the communication with the respective communication terminals has stored therein identification numbers of all communication terminals. The identification numbers are numbers exclusively useful for control in the communication network, and hence the identification numbers are, in general, not open to the public. Thus, the identification numbers are different from so-called telephone numbers.

The communication managing center for controlling communication with the respective communication terminals compares an identification number transmitted from each of the communication terminals and an identification number stored in the communication managing center with each other when the base station carries out communication with each of the communication terminals. If the identification numbers agree with each other, the communication managing center determines that the corresponding communication terminal is recognized, and carries out authentication processing for starting the communication.

FIG. 1 shows one example of an arrangement of a conventional communication system in which authentication processing is required. This communication system is a radiophone system in which an arbitrary number of a mobile station 1 as a communication terminal (in this case, portable telephone sets) is connected, wherein each of the mobile stations 1 carries out radio communication with a base station 2. The communication system includes a plurality of base stations 2 and a service area is formed depending on locations of the base stations 2. Each of the base stations 2 is connected to a telephone network 3, and each mobile station 1 can be connected through the base station 2 and an exchanger 301 within the telephone network 3 to an arbitrary telephone 4 of a subscriber. In some cases, each mobile station may be connected through the exchanger 3 by way of another base station 2 of the network to another mobile station (not shown).

In the mobile station 1 as the communication terminal, a transmission and reception circuit 102 carries out processings of transmission and reception under the control of a control unit 101 which is formed of a microcomputer so as to serve as a system controller. The transmission and reception circuit 102 is connected with an antenna 103 and a signal processed by the transmission and reception unit 102 is transmitted from the antenna 103 to the base station 2 side in a wireless fashion. Also, a signal transmitted from the base station 2 side is received by the antenna 103 and subjected to a reception processing in the transmission and reception unit 102.

A communication speech signal extracted from the signal received by the transmission and reception unit 102 is supplied to a handset 104 so that a speaker provided in the handset 104 emanates a sound. Further, a speech signal picked up by a microphone provided in the handset 104 is subjected to a transmission processing in the transmission and reception circuit 102 to transmit the processed speech signal to the base station 2 side through the antenna 103.

In the base station 2, a transmission and reception circuit 202 carries out transmission processing and reception processing under control of a control unit 201 provided for controlling communication. Specifically, a signal is transmitted from an antenna 203 connected to the transmission and reception circuit 202 in a wireless fashion and a radio signal received by the antenna 203 is subjected to reception processing in the transmission and reception circuit 202.

When a communication speech signal is transmitted between the mobile station 1 and the base station 2, in addition to the communication speech signal, a control signal is transmitted therebetween. That is, when communication is started by calling from either of the mobile station 1 and the base station 2, a control signal useful for calling a callee is initially transmitted. Before communication is started, control signals are transmitted bidirectionally so that the base station 2 side carries out authentication processing with its control unit 201 about the mobile station 1. Only when it is confirmed that the mobile station is an authentic terminal, control is carried out to start the communication between the mobile station 1 and the base station 2. This communication control is carried out by communication between the control unit 201 in the base station 2 side and the control unit 101 in the mobile station 1 side. In order to carry out the authentication processing, the mobile station 1 side has a fixed ID memory unit 105 and an ID comparing unit 106 so that the control unit 101 carries out the authentication processing by using the fixed ID memory unit 105 and the ID comparing unit 106. Also, on the base station 2 side, a fixed ID memory unit 302 and an ID comparing unit 303 are supplied in a communication managing center provided in the communication network 3 and that the base station 2 side can carry out the authentication processing by using the fixed ID memory unit 302 and the ID comparing unit 303. The fixed ID memory unit 105 in the mobile station 1 has stored therein identification data (hereinafter referred to as a fixed ID) set in advance for its own station. The fixed ID memory unit 302 in the communication network 3 has stored therein fixed IDs for all mobile stations capable of connecting to the communication system.

Now, the conventional authentication processing carried out by the system arrangement of FIG. 1 will be described.

In this case a description will be given of an example in which the mobile station 1 is called by calling a telephone 4 of a general subscriber. Initially, when a dial of the telephone 4 of the general subscriber is operated, a telephone number of a particular mobile station 1 is discriminated by the exchanger 301. Then, a telephone line is connected to a base station 2 located in an area in which the mobile station 1 is present. Thereafter, the control unit 201 in the base station 2 carries out calling processing for the corresponding mobile station 1. At this time, the control unit 201 reads out the fixed ID of the mobile station 1 from the fixed ID memory unit 302 and transmits a command directing that the mobile station 1 is to send back its fixed ID. The mobile station 1 reads out its own fixed ID stored in the fixed ID memory unit 105 and transmits the same to the base station 2 in accordance with the command.

The comparing unit 303 compares an ID read out from the fixed ID memory unit 302 in the telephone network 3 side with the ID transmitted from the mobile station 1, and the base station 2 determines by its control unit 201 whether they are coincident with each other or not. If it is determined that they are coincident to each other, then it is determined that the authenticity of the terminal is confirmed. Thereafter, a communication channel between the telephone of the general subscriber and the mobile station 1 and so on are set so that a speech signal or the like can be transmitted through the channel. Thus, communication is started.

Further, when a telephone call is made from the mobile station 1, operation upon the receiving call as described above is carried out inversely. That is, the mobile station 1 compares by its ID comparing unit 106 an ID transmitted from the base station 2 side with the ID set for its own station so as to carry out authentication processing (alternatively, the base station side may carry out the authentication processing by the comparing operation even when the mobile station makes a calling).

In this manner, the authentication processing is carried out for the opponent with which communication is made. Thus, it is possible to call a particular terminal designated by a telephone number or the like and make the particular terminal to be connected network, and also it is possible to prevent a non-registered terminal from being utilized as a mobile station illegally.

In the conventional system, however, the ID of each mobile station is a fixed code data. Therefore, if the ID is once discriminated by any method, a terminal authentically not registered can be utilized as a mobile station illegally by using the ID. Particularly, when the communication system is a radiophone system, the charge for a telephone call is imposed on an owner of an authenticated terminal using the same ID. Therefore, the charge for the illegal telephone call may be imposed on the authenticated user.

OBJECTS AND SUMMARY OF THE INVENTION

Therefore, it is a general object of the present invention to provide an improved authentication method, a radio communication system, a radio communication terminal, and a communication managing apparatus in which the aforesaid shortcomings and disadvantages encountered with the prior art can be eliminated.

More specifically, it is an object of the present invention to provide an authentication method for a radio communication system which makes it difficult to carry out illegal communication using identification data illegally deciphered.

According to the present invention, there is provided an authentication communication method for a radio communication system, a radio communication system, a radio communication terminal and a communication managing apparatus in which identification data stored in a radio communication terminal and a communication managing apparatus is updated with new data at every connection made between the radio communication terminal and a telephone network. Therefore, even if the identification data is illegally deciphered, it becomes difficult to carry out illegal communication using the identification data illegally deciphered. Accordingly, illegal utilization of the communication terminal can be effectively prevented.

The above and other objects, features, and advantages of the present invention will become apparent form the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENTS

Figure 1:
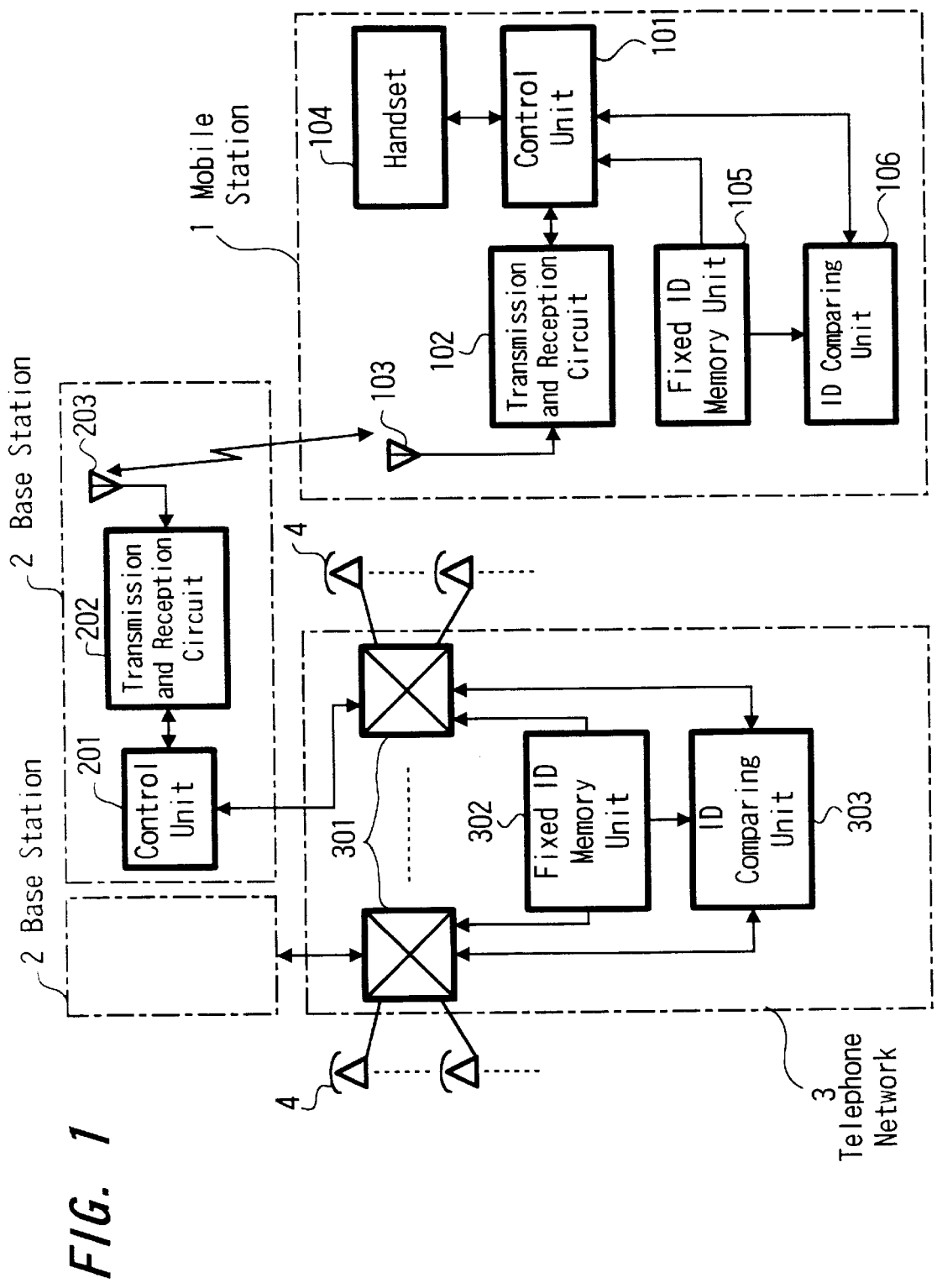
FIG. 1 is a diagram showing an arrangement of one example of a conventional communication system.

A first embodiment of the present invention will hereinafter be described with reference to FIGS. 2 through 5. In FIGS. 2 through 5, parts corresponding to those in FIG. 1, to which reference was made for explaining the prior art example, are attached with the same reference numerals and they will not be explained in detail.

Figure 2:
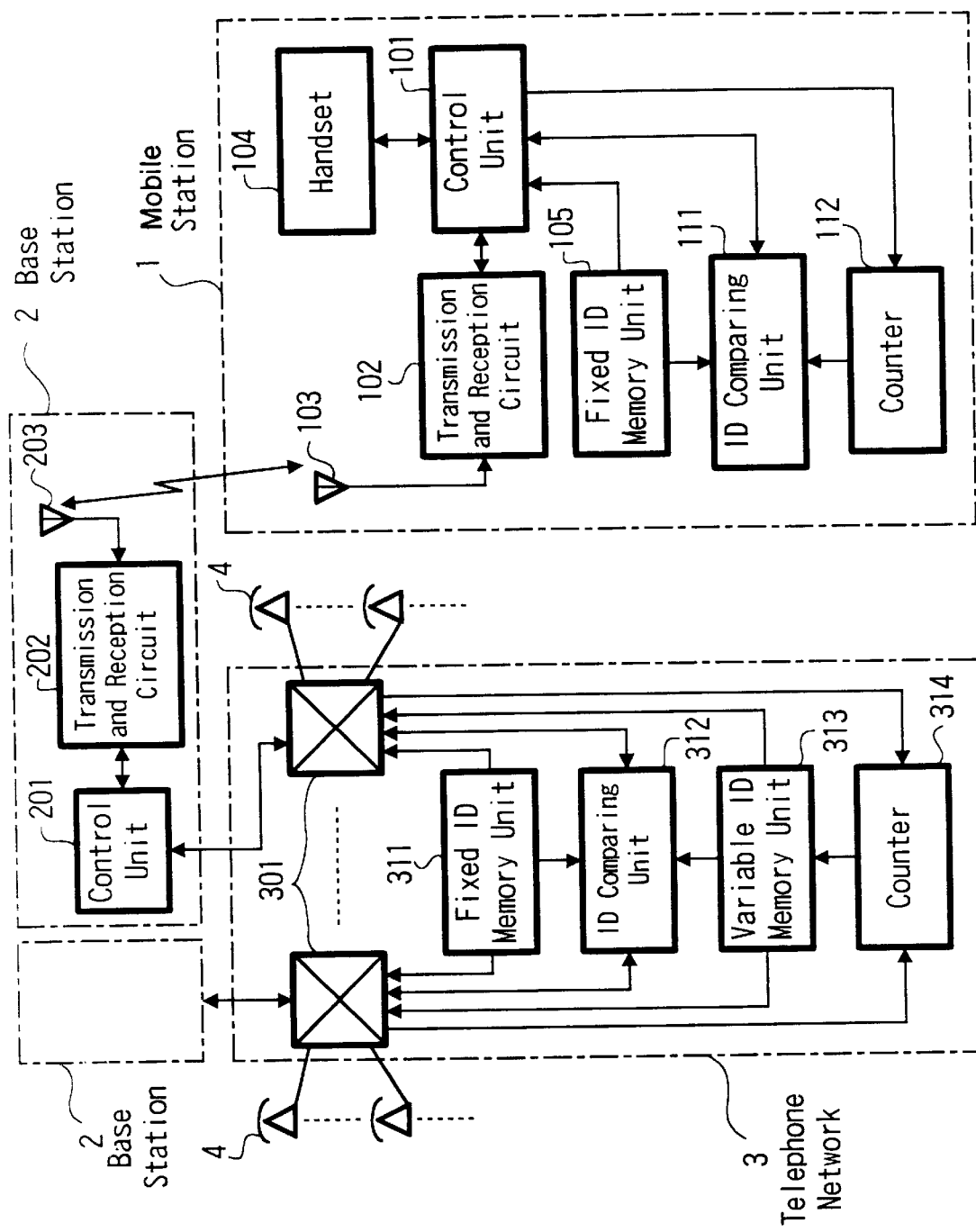
FIG. 2 is a diagram showing an arrangement of a communication system to which a first embodiment of the present invention is applied.

FIG. 2 is a diagram showing an arrangement of a radio communication system according to the present invention.

The communication system serves as a radiophone system in which a mobile station 1 (a radio communication terminal) can carry out communication with a general subscriber's telephone 4 or other mobile station through the telephone network 3 including exchangers and a communication managing apparatus by carrying out radio communication with a base station 2.

The mobile station 1 as a radio communication terminal carries out processings for transmission and reception by a transmission and reception unit 102 under the control of a control unit 101. The transmission and reception unit 102 is connected with an antenna 103. A signal processed for transmission by the transmission and reception unit 102 is transmitted from the antenna 103 to the base station 2 in a wireless fashion, and a signal transmitted from the base station 2 side is received by the antenna 103 and processed by the transmission and reception unit 102.

Of the signals received by the transmission and reception unit 102, a speech signal for communication is supplied to a handset 104, and speech emanates from a speaker provided within the handset 104. Further, a speech signal picked-up by a microphone within the handset 104 is processed by the transmission and reception unit 102 for transmission and transmitted to the base station 2 side through the antenna 103.

The base station 2 carries out processings for transmission and reception by a transmission and reception unit 202 under control of a control unit 201 for control communication, transmits a processed signal from an antenna 203 connected to the transmission and reception unit 202 in a wireless fashion, and carries out reception processing on a signal received by the antenna 203 by the transmission and reception unit 202. The base station has the same arrangement as that of the prior art example so far.

In order to carry out authentication processing between the mobile station 1 and the base station 2, the mobile station 1 is provided with a fixed ID memory unit 105, an ID comparing unit 111 and a counter 112, while a telephone network 3 is provided with a fixed ID memory unit 311, an ID comparing unit 312, a variable ID memory unit 313 and a counter 314. The fixed ID memory unit 311, the ID comparing unit 312, the variable ID memory unit 313 and the counter 314 serve as a communication managing apparatus. The telephone network 3 is connected to the base station 2.

The fixed ID memory unit 105 on the mobile station 1 memorizes an ID, i.e., identification data predetermined for each terminal. Further, the counter 112 is a counter which is capable of changing sequentially a count value by a predetermined amount at every unit of communication using the terminal, and the count value provided by the counter 112 is utilized for a variable ID. A counting operation by the counter 112 is controlled by the control unit 101 of the mobile station 1. When a fixed ID and a variable ID are transmitted from the base station side, the ID comparing unit 111 compares the fixed ID set in the fixed ID memory unit 105 with the variable ID set in the counter 112 under control of the control unit 101, and supplies information about whether or not they coincide with each other to the control unit 101.

Further, the fixed ID memory unit 311 on the telephone network 3 side memorizes fixed IDS of all mobile stations connectable to the radiophone system. Further, the variable ID memory units 313 memorizes variable IDs of all the mobile stations connectable to the radiophone system. In this case, if communication is carried out by any mobile station, the telephone network sets in the counter 314, a corresponding variable ID of the mobile station stored in the variable ID memory unit 313, and changes the count value by a predetermined amount, under control of the control unit 201 of the base station 2 which is involved in the communication. Then, the new count value is set as a new variable ID of the corresponding mobile station and stored in the variable ID memory unit 313 under control of the control unit 201.

Next, processing carried out when communication is effected between the base station 2 and the mobile station 1 by the arrangement will be described. First, processing carried out up to the start of communication by calling from the mobile station 1 will be described with reference to the flowchart of FIG. 3. The following processings are carried out under control of the control unit 101 on the mobile station 1 side and under control of the control unit 201 on the base station 2 side.

Now, it is assumed that a calling operation, i.e., input of receiver's telephone number and transmitting operation, is carried out on the mobile station 1 (step S12) when both of the mobile station 1 and the base station 2 are placed in a waiting mode steps S11, S21). If such calling operation is carried out, data of the fixed ID, the variable ID, the telephone number of the self station and data of the receiver's telephone number set in the self station are transmitted from the mobile station 1 to the base station 2 located in the area by use of a predetermined control channel (step S13).

When the base station 2 side receives the data (step S22), the base station 2 reads out the fixed ID which corresponds to the telephone number of the mobile station 1 from the fixed ID memory unit 311 within the telephone network 3. Then, the base station 2 supplies the fixed ID to the ID comparing unit 312, and also supplies the received fixed ID to the ID comparing unit 312. The ID comparing unit 312 compares both the fixed IDs with each other to determine whether or not they are coincident to each other, whereby the control unit 201 carries out authentication processing (step S23). At this time, if they are not coincident to each other, it is determined that the mobile station is not authorized. Thus, the mobile station 1 is prohibited from being connected to the network (step S28).

If it is determined that both the fixed IDS are coincident with each other in step S23, the variable ID corresponding to the telephone number of the mobile station is read out from the variable ID memory unit 313 within the telephone network 3 and then supplied to the ID comparing unit 312, and the received variable ID is supplied to the ID comparing unit 312. The ID comparing unit 312 compares both the variable IDS with each other to determine whether or not they are coincident with each other, whereby the control unit 201 carries out authentication processing (step S24). Also at this time, if they are not coincident to each other, it is determined that the mobile station is not authorized. Thus, the mobile station 1 is prohibited from being connected to the network (step S28).

If it is determined that the variable IDs are coincident with each other in step S24, a connectability confirmation signal and a communication channel designation signal are transmitted from the base station 2 to the corresponding mobile station 1 by use of a predetermined control channel (step S25). When the mobile station 1 receives the signals (step S14), the mobile station increments the count value of the incorporated counter 112 by a predetermined amount (step S15) and carries out communication through a designated communication channel (step S16). Further, after the communication channel designation signal is transmitted, the base station 2 side increments the variable ID corresponding to the mobile station stored in the variable ID memory unit 313 of the telephone network 3 side by use of the counter 314 (step S26), and then carries out communication through the designated communication channel (step 27). Thus, communication is carried out between the mobile station 1 and the base station 2 through the communication channel, so that communication is started between the connected receiver and the mobile station 1 through the base station 2 (step S17).

Next, processing up to the start of communication by calling from a caller connected to the base station 2 will be described with reference to a flowchart of FIG. 4.

Now, when both of the mobile station 1 and the base station are placed in a waiting mode (step S31, S41), if it is confirmed that a command for calling the mobile station 1 is issued within the area of the base station 2 (this command is issued from an exchanger 301 side based on a calling operation from a general subscriber's telephone 4, for example) (step S42), then the fixed ID and the variable ID set in the station and data of the receiver's telephone number are transmitted to the corresponding mobile station 1 (i.e., the mobile station 1 on the callee side) through a predetermined control channel (step S43). At this time, the control unit 201 of the base station 2 determines the fixed ID and the variable ID in accordance with the memory data stored in the fixed ID memory unit 311 and the variable ID memory unit 313 on the telephone network 3 side.

When the mobile station 1 side receives the data (step S32), the mobile station reads out the fixed ID memorized in its own fixed ID memory unit 105 and supplies the same to the ID comparing unit 111, and also supplies the received fixed ID to the ID comparing unit 111. The ID comparing unit 111 compares both the fixed IDs with each other to determine whether or not they are coincident with each other, whereby the control unit 101 carries out the authentication processing (step S33). At this time, if they are not coincident to each other, it is determined that the calling is not authorized. Thus, the mobile station 1 is prohibited from being connected to the network (step S39).

If it is determined that both the fixed IDs are coincident with each other in step S33, the variable ID stored in its own counter 112 is read out and then supplied to the ID comparing unit 111, and the received variable ID is supplied to the ID comparing unit 111. The ID comparing unit 111 compares both the variable IDs with each other to determine whether or not they are coincident with each other, whereby the control unit 101 carries out authentication processing (step S34). Also at this time, if they are not coincident to each other, it is determined that the calling is not authorized. Thus, the mobile station 1 is prohibited from being connected to the network (step S39).

If it is determined that the variable IDs are coincident with each other in step S34, a connectability confirmation signal is transmitted from the mobile station 1 to the base station 2 through a predetermined control channel so that the base station 2 receives the signal. When the base station 2 receives the connectability confirmation signal, it transmits a communication channel designation signal to the mobile station 1 so that the mobile station 1 receives the signal (steps S35, S44). When the mobile station 1 receives the communication channel designation signal, it increments the count value of the incorporated counter 112 by a predetermined amount (step S36) and then carries out communication through a designated communication channel (step S37). Further, after the communication channel designation signal is transmitted, the base station 2 side also increments the variable ID corresponding to the mobile station stored in the variable ID memory unit 313 of the telephone network 3 side by use of the counter 314 (step S45), and then carries out communication through the designated communication channel (step 46). Thus, communication is carried out between the mobile station 1 and the base station 2 through the communication channel, so that communication is started between the connected caller and the mobile station 1 through the base station 2 (step S38).

Figure 4:
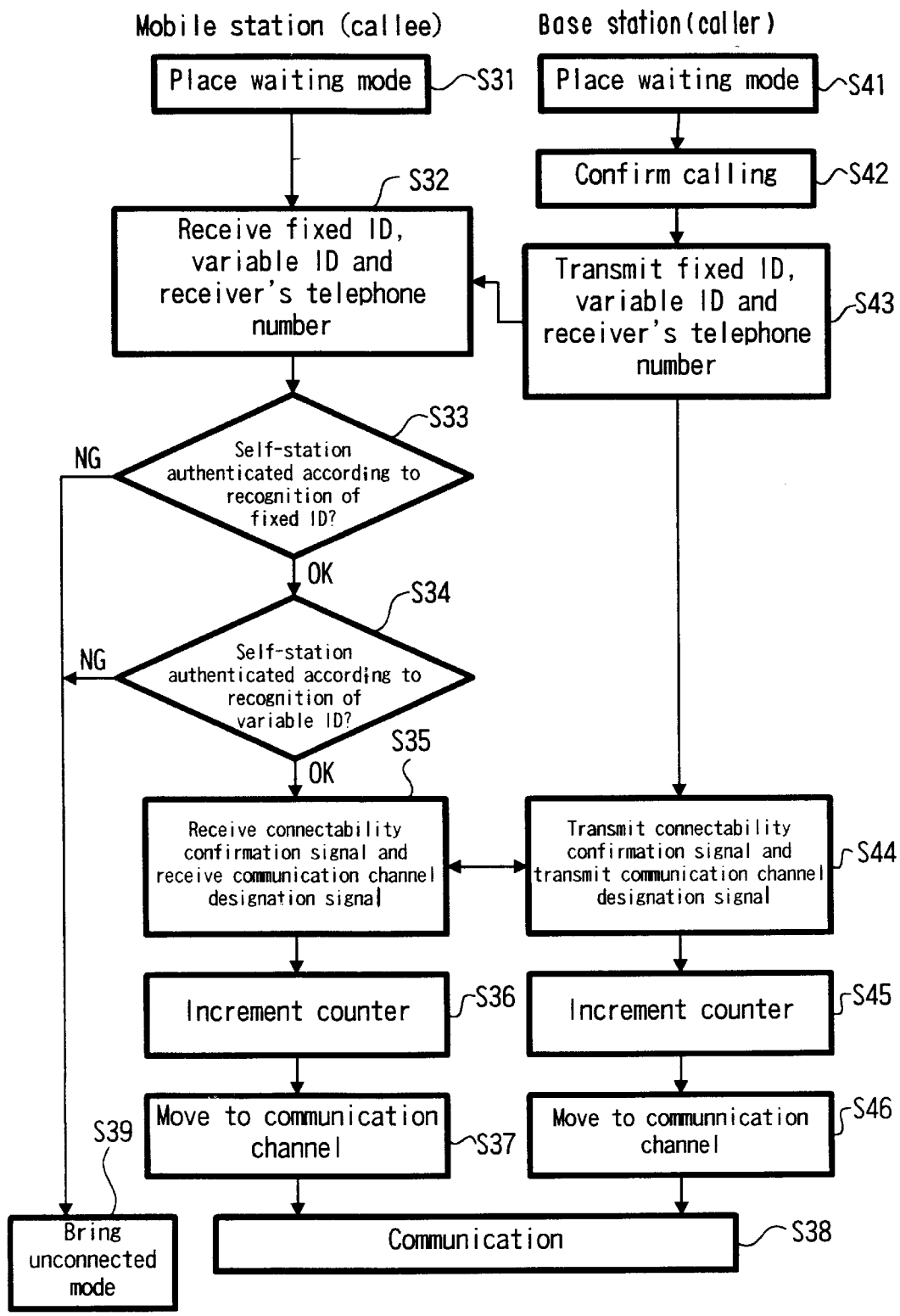
FIG. 4 is a flowchart showing a communication processing (when a calling is made from a base station) carried out by the first embodiment.
Figure 5:
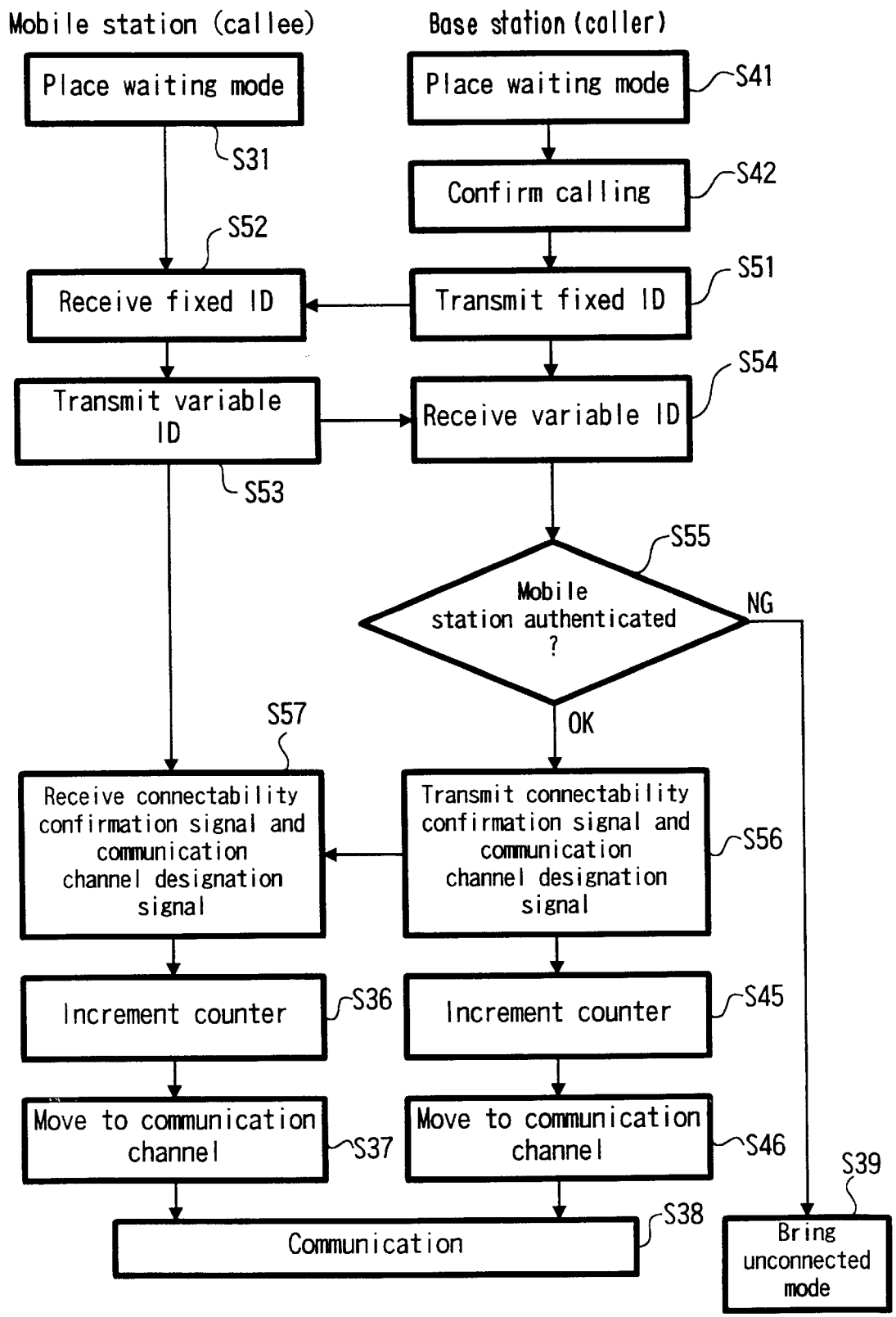
FIG. 5 is a flowchart showing a modified example of a communication processing (when a calling is made from a base station) carried out by the first embodiment.

While in the processing of FIG. 4 the authentication processing is carried out in the mobile station 1 when the mobile station is placed in the callee side, similarly to the case in which the mobile station 1 is placed in the caller side, the authentication processing may be carried out on the base station 2 side. FIG. 5 shows a flowchart when the processing is carried out as above. Processing of the flowchart of FIG. 5 identical to processing in the flowchart of FIG. 4 is attached with the same step numbers.

In processing in FIG. 5 will be described. When the base station 2 confirms a calling (step S42), the base station 2 transmits data of the fixed ID set in the station and data of the receiver's telephone number to the corresponding mobile station 1 (i.e., the mobile station 1 on the callee side) through a predetermined control channel (step S51). When the mobile station 1 receives the fixed ID transmitted from the base station 2 (step 52), it reads out the variable ID set in its own station from the counter 112 and transmits the same to the base station 2 side (step S53). When the base station 2 side receives the variable ID (step S54), the ID comparing unit 312 compares the received ID and the variable ID memorized in the variable ID memory unit 313 on the telephone network 3 side to determine whether or not they are coincident with each other (step S55). At this time, if they are not coincident to each other, it is determined that the mobile station is not authorized. Thus, the mobile station 1 is prohibited from being connected to the network (step S39).

If it is determined that the variable IDs are coincident with each other, a connectability confirmation signal and a communication channel designation signal are transmitted from the base station 2 to the corresponding mobile station 1 through a predetermined control channel (step S56). When the mobile station 1 receives the signals (step S57), the mobile station increments the count value of the incorporated counter 112 by a predetermined amount (step S36) and carries out communication through a designated communication channel (step S37). Further, after the communication channel designation signal is transmitted, the base station 2 side also increments the variable ID corresponding to the mobile station stored in the variable ID memory unit 313 of the telephone network 3 side by use of the counter 314 (step S45), and then carries out communication through the designated communication channel (step 46). Thus, communication is carried out between the mobile station 1 and the base station 2 through the communication channel, so that communication is started between the connected receiver and the mobile station 1 through the base station 2 (step S38).

Figure 3:
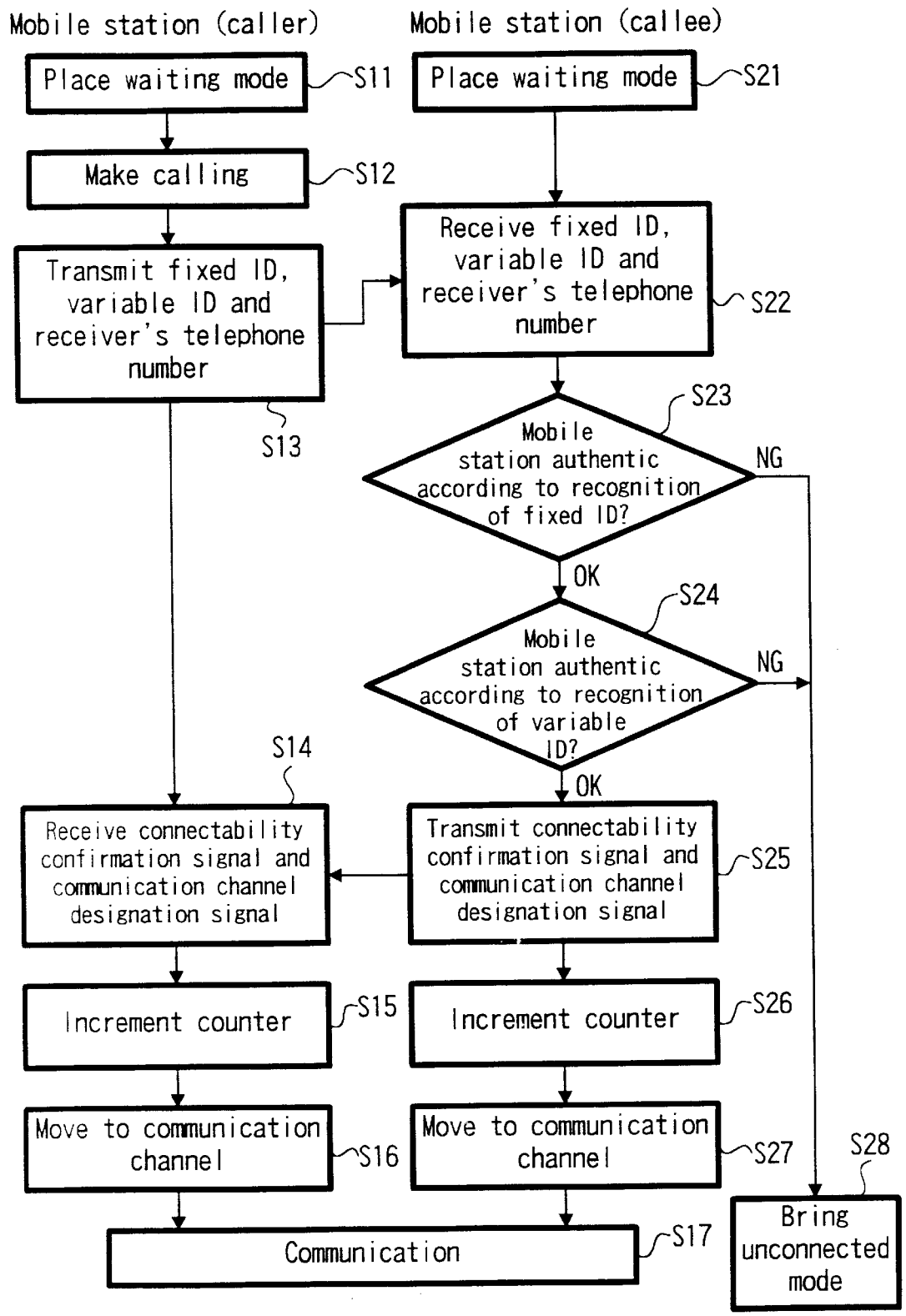
FIG. 3 is a flowchart showing a communication processing (when a calling is made from a mobile station) carried out by the first embodiment.

While in the example of FIG. 5 the authentication processing is carried out based on the determination of only the variable ID in the base station, similarly to the case of the example of FIG. 3, the base station may carry out determination processing by use of the fixed ID. Further, the authentication processing may be carried out in both of the mobile station and the base station.

When the authentication processing is carried out as in the first embodiment shown in FIG. 2, the ID set for every terminal will change at every unit of communication on both the side of the terminal as the mobile station and the side in which the radio communication is managed. Therefore, even if a third person reads the ID illegally and tries to communicate illegally by use of the illegally read ID, the ID has been likely to be already changed. Therefore, it is possible to effectively prevent the third person from illegally utilizing the communication terminal.

Moreover, in the present example, similarly to the prior art, the authentication is carried out with the recognition processing which is carried out by using the fixed ID set in every terminal. Therefore, the authentication processing can be more positively carried out. Furthermore, even if the variable ID is lost on either the side of the mobile station and the base station due to any cause, it is possible to cope with the trouble by means of the authentication processing using the fixed ID. As to the authentication processing when the variable ID is lost, it is necessary to provide a certain rule.

Further, according to the present example, new identification data are is generated on both the side of the terminal and the side in which the radio communication is managed, and the generated ID is held in the respective memory units. Therefore, it is unnecessary to transmit the updated ID between both the sides in a wireless fashion, and hence a chance for the updated ID to be leaked to the outside can be eliminated.

Figure 6:
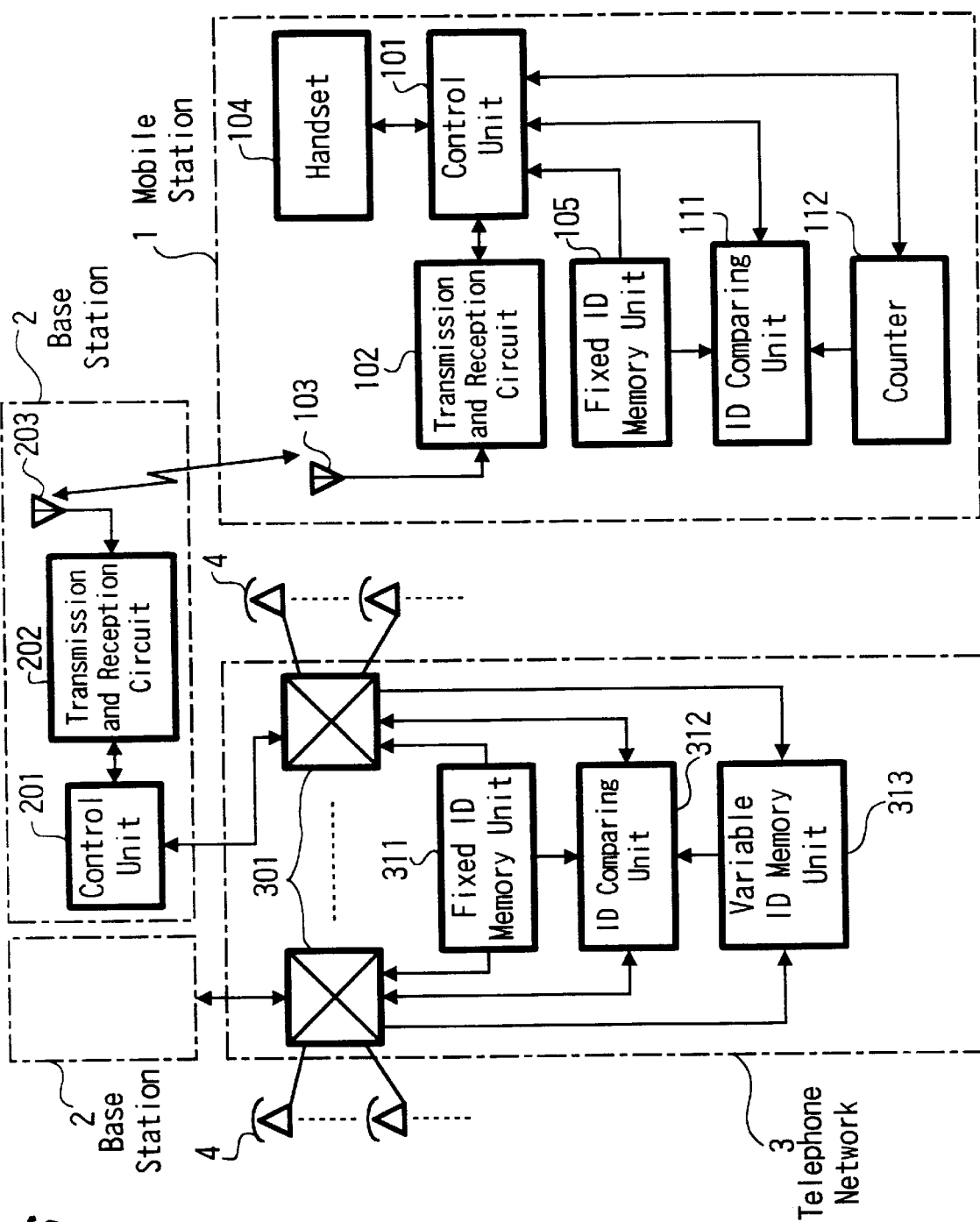
FIG. 6 is a diagram showing an arrangement of a communication system to which a second embodiment of the present invention is applied.
Figure 7:
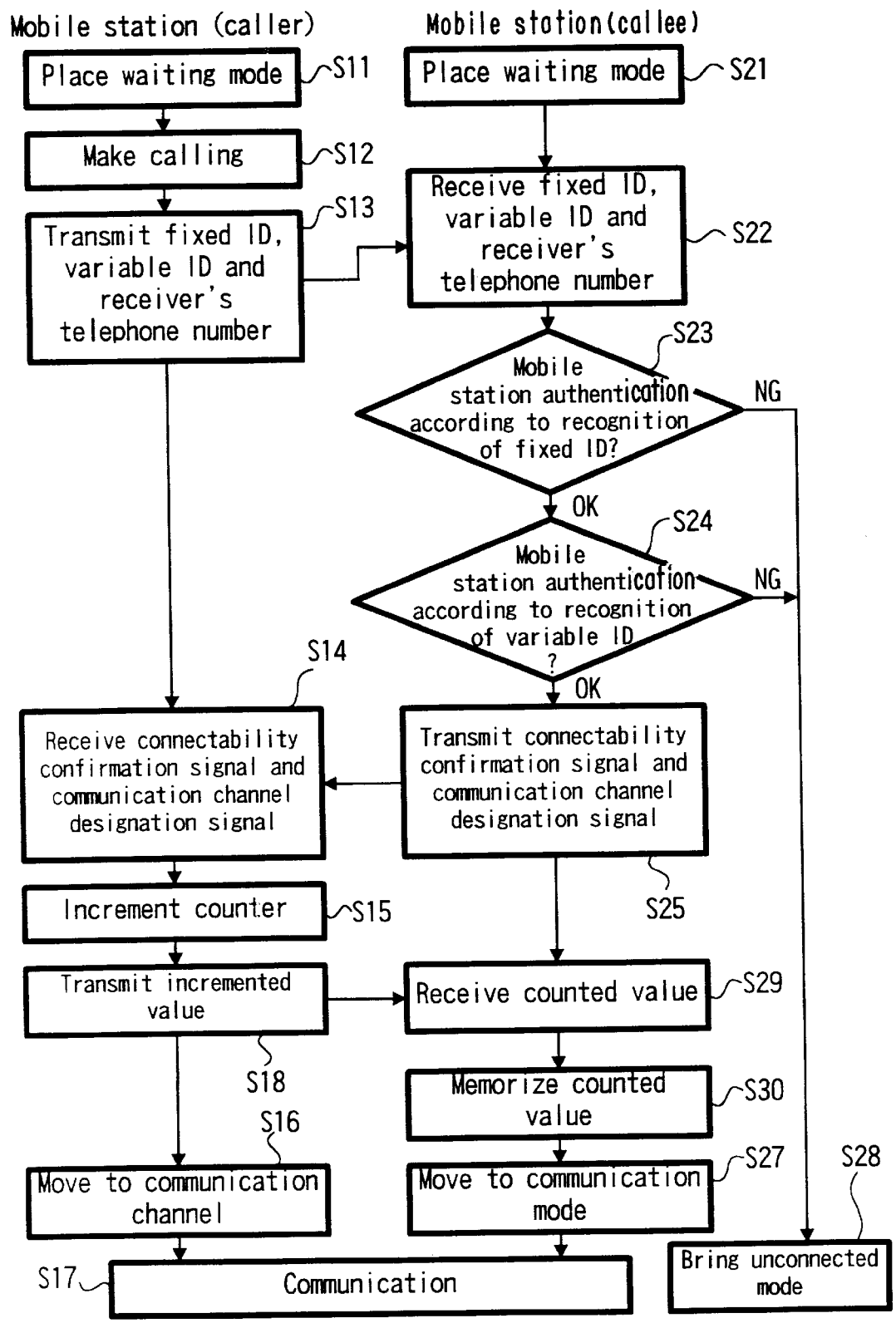
FIG. 7 is a flowchart showing a communication processing carried out by the second embodiment.
Figure 8:
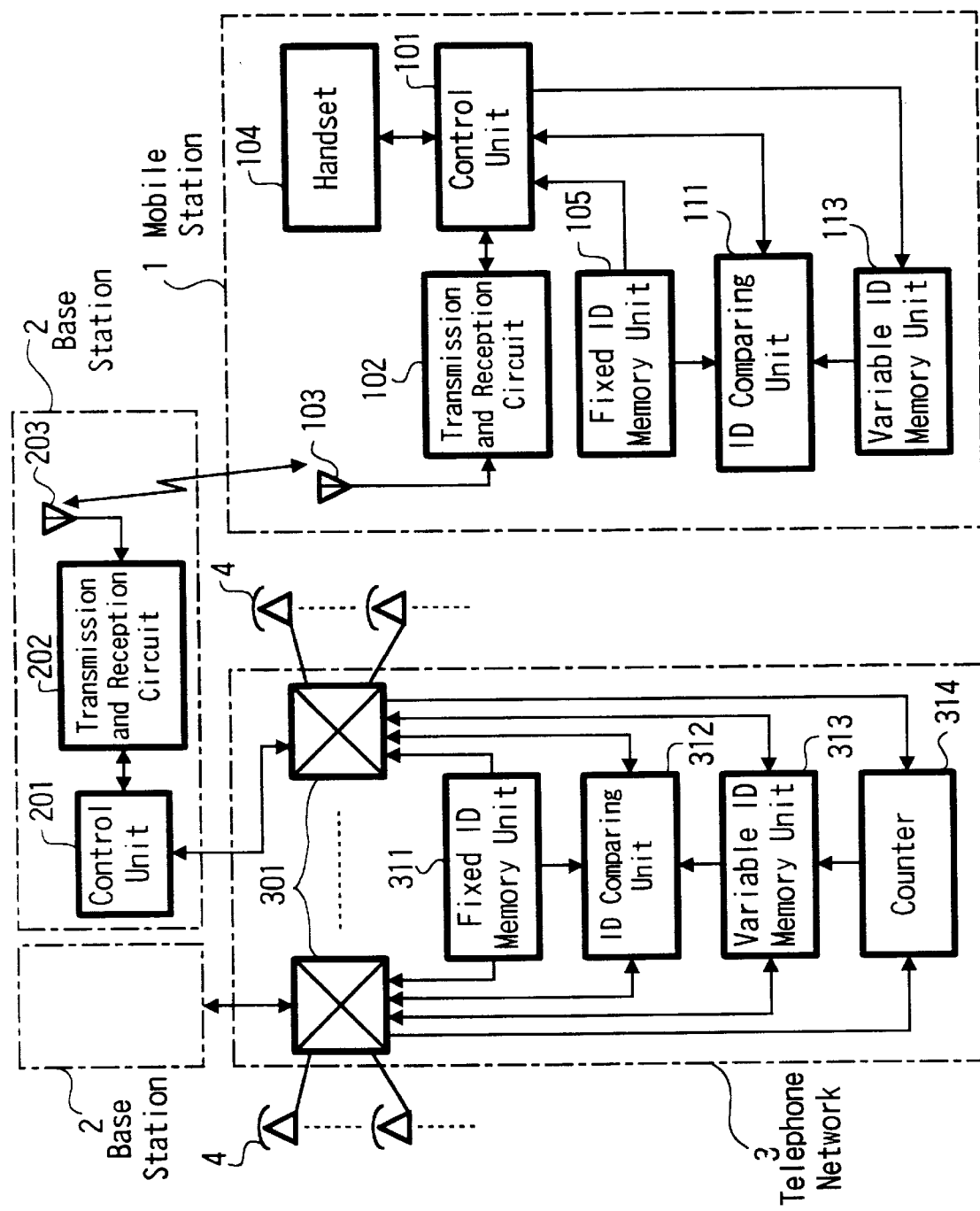
FIG. 8 is a diagram showing an arrangement of a communication system to which a modified example of the second embodiment is applied.

Next, a second embodiment of the present invention will be described with reference to FIG. 6 to FIG. 8. In FIG. 6 to FIG. 8, parts corresponding to those described as the prior art example of FIG. 1 and those described as the first embodiment of FIG. 2 to FIG. 5 are attached with the same reference numerals and their detailed description will be omitted.

FIG. 6 is a diagram showing an arrangement of the radio communication system according to the second embodiment of the present invention. Similarly to the above-described first embodiment, the system serves as a radiophone system in which the mobile station 1 can carry out communication with a general subscriber's telephone 4 or other mobile station 2 through the telephone network 3 by means of radio communication with the base station 2. The fundamental arrangement thereof is the same as that of the first embodiment described with FIG. 2.

In the present example, the telephone network 3 side does not have the counter 314, but the telephone network 3 has the variable ID memory unit 313 which updates the variable ID transmitted from the mobile station side each time one unit of communication is carried out and memorizes the same therein. Other arrangements are the same as those of the first embodiment. Therefore, the fixed ID memory unit 311, the ID comparing unit 312 and the variable ID memory unit 313 serve as the communication managing apparatus.

Next, processing carried out when communication is effected between the base station 2 and the mobile station 1 by the arrangement of FIG. 6 will be described. First, processing carried out up to the start of communication by calling from the mobile station 1 will be described with reference to the flowchart of FIG. 7. The following processings are carried out under control of the control unit 101 on the mobile station 1 side and under control of the control unit 201 on the base station 2 side.

Now, it is assumed that a calling operation, i.e., input of a receiver's telephone number and transmitting operation, is carried out by the mobile station 1 (step S12) when both of the mobile station 1 and the base station 2 are placed in a waiting mode steps S11, S21). If such a calling operation is carried out, the fixed ID and the variable ID set in the self station and data of its own telephone number and the receiver's telephone number are transmitted from the mobile station 1 to the base station 2 located in the area by use of a predetermined control channel (step S13).

When the base station 2 side receives the data (step S22), the base station 2 reads out the fixed ID corresponding to the telephone number of the mobile station from the fixed ID memory unit 311 within the communication network 3 and supplies the same to the ID comparing unit 312, and also supplies the received fixed ID to the ID comparing unit 312. The ID comparing unit 312 compares both the fixed IDs with each other to determine whether or not they are coincident to each other, whereby the control unit 201 carries out authentication processing (step S23). At this time, if they are not coincident to each other, it is determined that the mobile station is not authorized. Thus, the mobile station 1 is prohibited from being connected to the telephone network 3 (step S28).

If it is determined that both the fixed IDs are coincident with each other in step S23, the variable ID corresponding to the telephone number of the mobile station is read out from the variable ID memory unit 313 within the telephone network 3 and supplied to the ID comparing unit 312, and the received variable ID is supplied to the ID comparing unit 312. The ID comparing unit 312 compares both the variable IDs with each other to determine whether or not they are coincident with each other, whereby the control unit 201 carries out authentication processing (step S24). Also at this time, if they are not coincident to each other, it is determined that the mobile station is not authorized. Thus, the mobile station 1 is prohibited from being connected to the network (step S28).

If it is determined that the variable IDs are coincident with each other in step S24, a connectability confirmation signal and a communication channel designation signal are transmitted from the base station 2 to the corresponding mobile station 1 by use of a predetermined control channel (step S25). When the mobile station 1 receives the signals (step S14), the mobile station increments the count value of the incorporated counter 112 by a predetermined amount (step S15). Then, the incremented count value of the counter 112 is transmitted as the variable ID to the base station 2 by use of a predetermined channel (step S18). When the base station 2 receives the variable ID (count value) (step S29), it memorizes the received variable ID in the variable ID memory unit 313 within the communication network 3 (step S30).

On the mobile station 1 side, communication is carried out through a communication channel designated in step S14 (step S16). Further, after the variable ID is stored in the variable ID memory unit 313, the base station 2 side carries out communication through the designated communication channel (step S27). Thus, communication is carried out between the mobile station 1 and the base station 2 through the communication channel, so that communication is started between the connected receiver and the mobile station 1 through the base station 2 (step S17).

Since the processing of the second embodiment is carried out as above, the counter, which serves as a means for generating a new variable ID, may be provided only in each terminal side serving as the mobile station. Therefore, the communication managing side need not generate a new variable ID, and the system can be simply arranged accordingly.

While the flowchart of FIG. 7 has been described in connection to the operation upon calling from the mobile station, if the mobile station serves as a callee side, the variable ID updated by the counter 112 of the mobile station may be transmitted to the base station 1 side and stored therein before starting communication.

Further, while in this example data of the updated variable ID itself is transmitted from the mobile station to the base station in a wireless fashion, difference data between the variable ID before update and the variable ID after update may be transmitted. Furthermore, the data may be transmitted after encryption.

While in the example of FIG. 6 and FIG. 7 the counter is provided only on the side of the mobile station 1, as shown in FIG. 8, the counter 314 for generating an updated variable ID may be provided on only the side of the telephone network 3 side. Specifically, before communication is started after the authentication processing is ended, the variable ID updated by the counter 314 on the side of the telephone network 3 may be stored in the memory unit 313 in the telephone network 3 and transmitted from the base station 2 to the mobile station 1 in a wireless fashion to be stored in the variable ID memory unit 113 in the mobile station 1. Since the updated ID is generated on the telephone network side, the update of the ID is carried out under control of the communication managing center side. Therefore, the updated values of the variable ID or the like can be managed intensively, each terminal side need not be provided with a circuit (counter) for generating the ID, and the terminal can be simply arranged accordingly.

Figure 9:
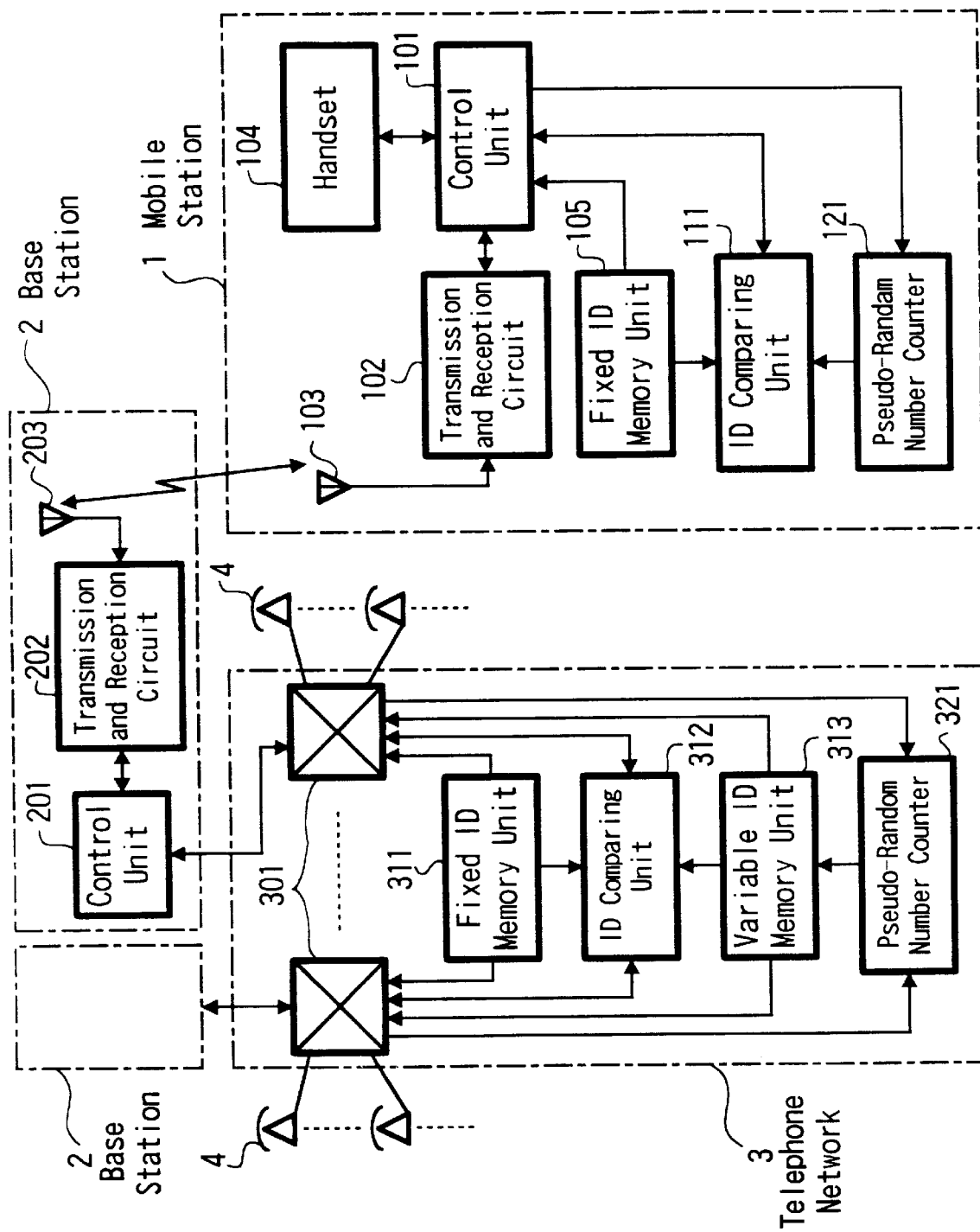
FIG. 9 is a diagram showing an arrangement of a communication system to which a third embodiment of the present invention is applied.
Figure 10:
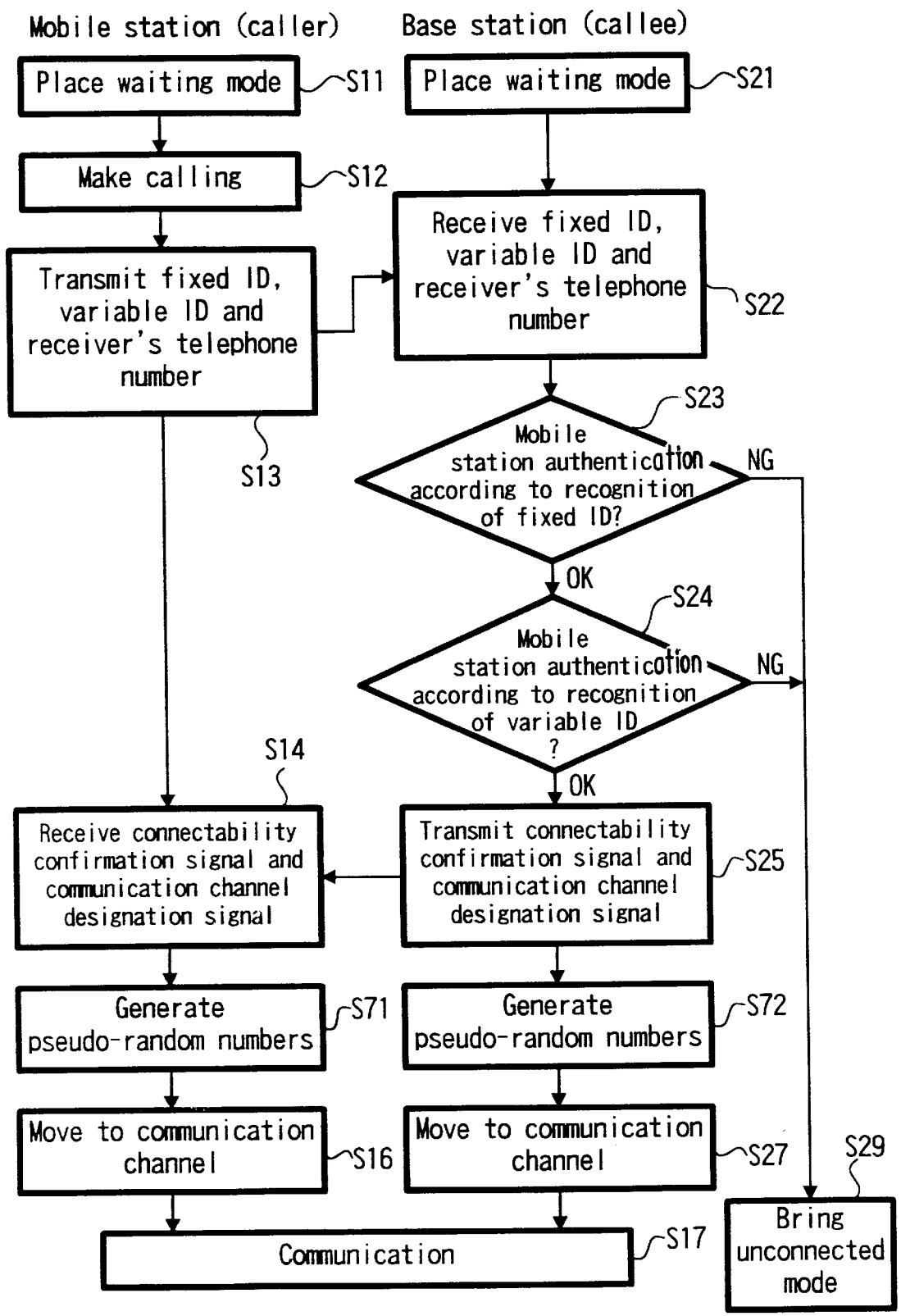
FIG. 10 is a flowchart showing a communication processing carried out by the third embodiment.

Next, a third embodiment of the present invention will be described with reference to FIG. 9 and FIG. 10. In FIG. 9 and FIG. 10, parts corresponding to those described as the prior art example of FIG. 1 and those described as the first embodiment of FIG. 2 to FIG. 5 are attached with the same reference numerals and their detailed description will be omitted.

FIG. 9 is a diagram showing an arrangement of the communication system of the present example. Similarly to the above-described first and second embodiments, the system serves as a radiophone system in which the mobile station 1 can carry out communication with a general subscriber's telephone 4 or other mobile station 2 through the telephone network 3 by means of radio communication with the base station 2. The fundamental arrangement thereof is the same as that of the first embodiment described with FIG. 2.

In the present example, the mobile station 1 is provided with a pseudo-random number counter 121 instead of a counter and the telephone network 3 side is provided with a pseudo-random number counter 321 instead of a counter. In this case, the respective pseudo-random counters 121, 321 are counters for generating pseudo-random values (actually values changing with regularity) such as numbers of M-sequence or the like, for example. Both of the pseudo-random counters 121, 321 have the same arrangement for generating the same pseudo-random numbers. Other arrangements are the same as those of the first embodiment. Therefore, the fixed ID memory unit 311, the ID comparing unit 312, the variable ID memory unit 313 and the pseudo-random counter 321 serve as the communication managing apparatus.

Next, processing carried out when communication is effected between the base station 2 and the mobile station 1 by the arrangement of FIG. 9 will be described. In this case, processing carried out up to the start of communication by calling from the mobile station 1 will be described with reference to a flowchart of FIG. 10. The following processings are carried out under control of the control unit 101 on the mobile station 1 side and under control of the control unit 201 on the base station 2 side.

Now, it is assumed that a calling operation, i.e., input of a receiver's telephone number and transmitting operation, is carried out (step S12) when both of the mobile station 1 and the base station 2 are placed in a waiting mode (steps S11, S21). If such a calling operation is carried out, the fixed ID and the variable ID set in the self station and data of the telephone number of the self station and the receiver's telephone number are transmitted from the mobile station 1 to the base station 2 located in the area by use of a predetermined control channel (step S13).

When the base station 2 side receives the data (step S22), it reads out the fixed ID corresponding to the telephone number of the mobile station 1 from the fixed ID memory unit 311 within the communication network 3 and supplies the same to the ID comparing unit 312, and also supplies the received fixed ID to the ID comparing unit 312. The ID comparing unit 312 compares both the fixed IDs with each other to determine whether or not they are coincident to each other, whereby the control unit 201 carries out authentication processing (step S23). At this time, if they are not coincident to each other, it is determined that the mobile station is not authorized. Thus, the mobile station 1 is prohibited from being connected to the network (step S28).

If it is determined that both the fixed IDs are coincident with each other in step S23, the variable ID corresponding to the telephone number of the mobile station is read out from the variable ID memory unit 313 within the telephone network 3 and supplied to the ID comparing unit 312, and the received variable ID is supplied to the ID comparing unit 312. The ID comparing unit 312 compares both the variable IDs with each other to determine whether or not they are coincident with each other, whereby the control unit 201 carries out authentication processing (step S24). Also at this time, if they are not coincident to each other, it is determined that the mobile station is not authorized. Thus, the mobile station 1 is prohibited from being connected to the network (step S28).

If it is determined that the variable IDs are coincident with each other in step S24, a connectability confirmation signal and a communication channel designation signal are transmitted from the base station 2 to the corresponding mobile station 1 by use of a predetermined control channel (step S25). When the mobile station 1 receives the signals (step S14), pseudo-random numbers for the next stage are generated by the incorporated pseudo-random number counter 121 (step S71), and communication is carried out through the designated communication channel (step S16). Further, after the communication channel designation signal is transmitted, the base station 2 side changes the variable ID corresponding to the mobile station stored in the variable ID memory unit 313 of the telephone network 3 into pseudo-random numbers for the next stage by use of the pseudo-random number counter 321 (step S72) and then carries out communication through the designated communication channel (step S27). Thus, communication is carried out between the mobile station 1 and the base station 2 through the communication channel, so that communication is started between the connected receiver and the mobile station 1 through the base station 2 (step S17).

Since the processings of the third embodiment are carried out as above, the variable ID set for each mobile station is updated to a value based on the pseudo-random numbers, the variable ID apparently changes at random, and the identification data can be effectively prevented from being read.

While the flowchart of FIG. 10 has been described in connection to the operation upon calling from the mobile station, if the mobile station serves as a callee side, the variable ID updated by the pseudo-random number counter may be set in each station before starting communication.

Figure 11:
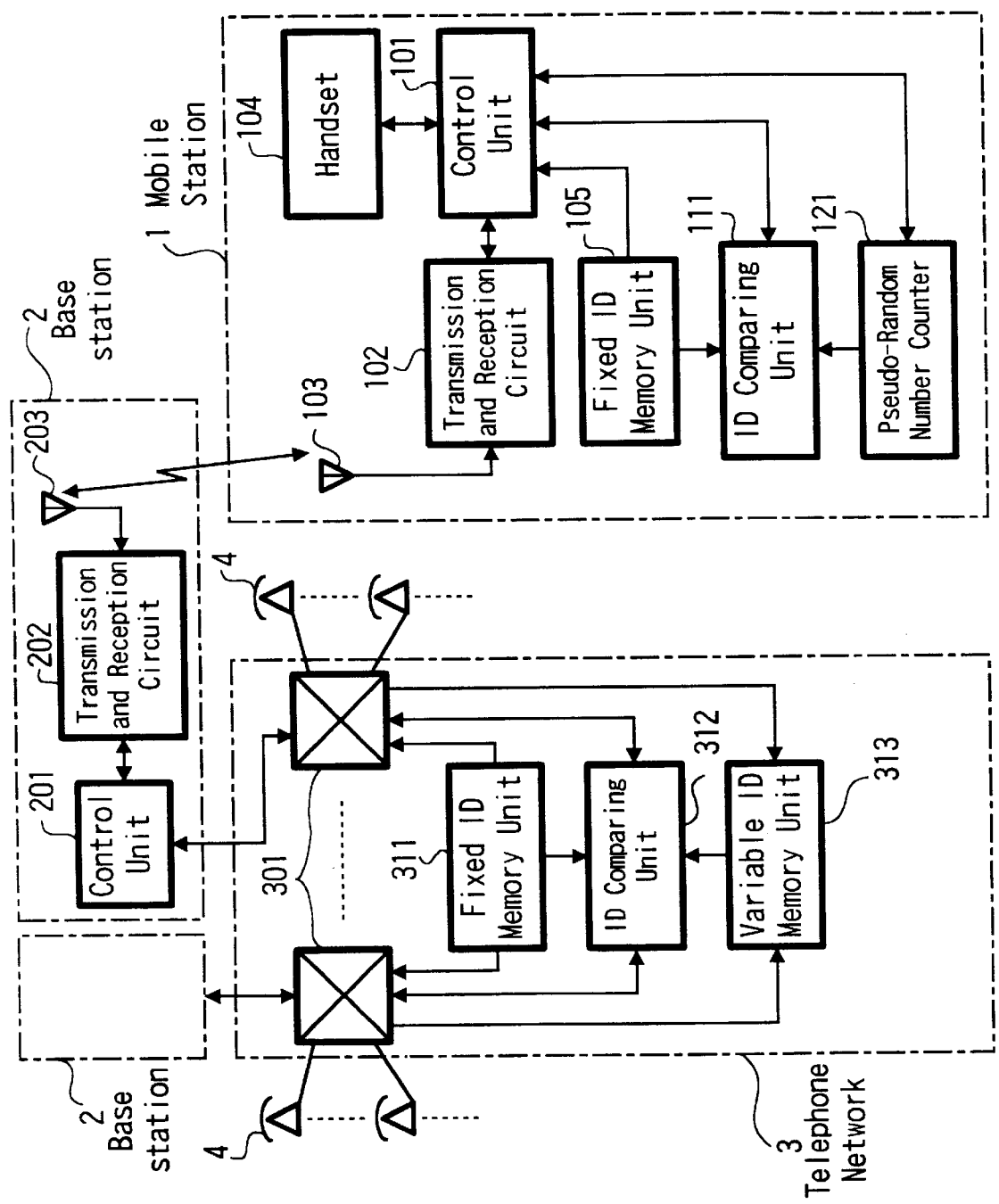
FIG. 11 is a diagram showing an arrangement of a communication system to which a fourth embodiment of the present invention is applied.
Figure 12:
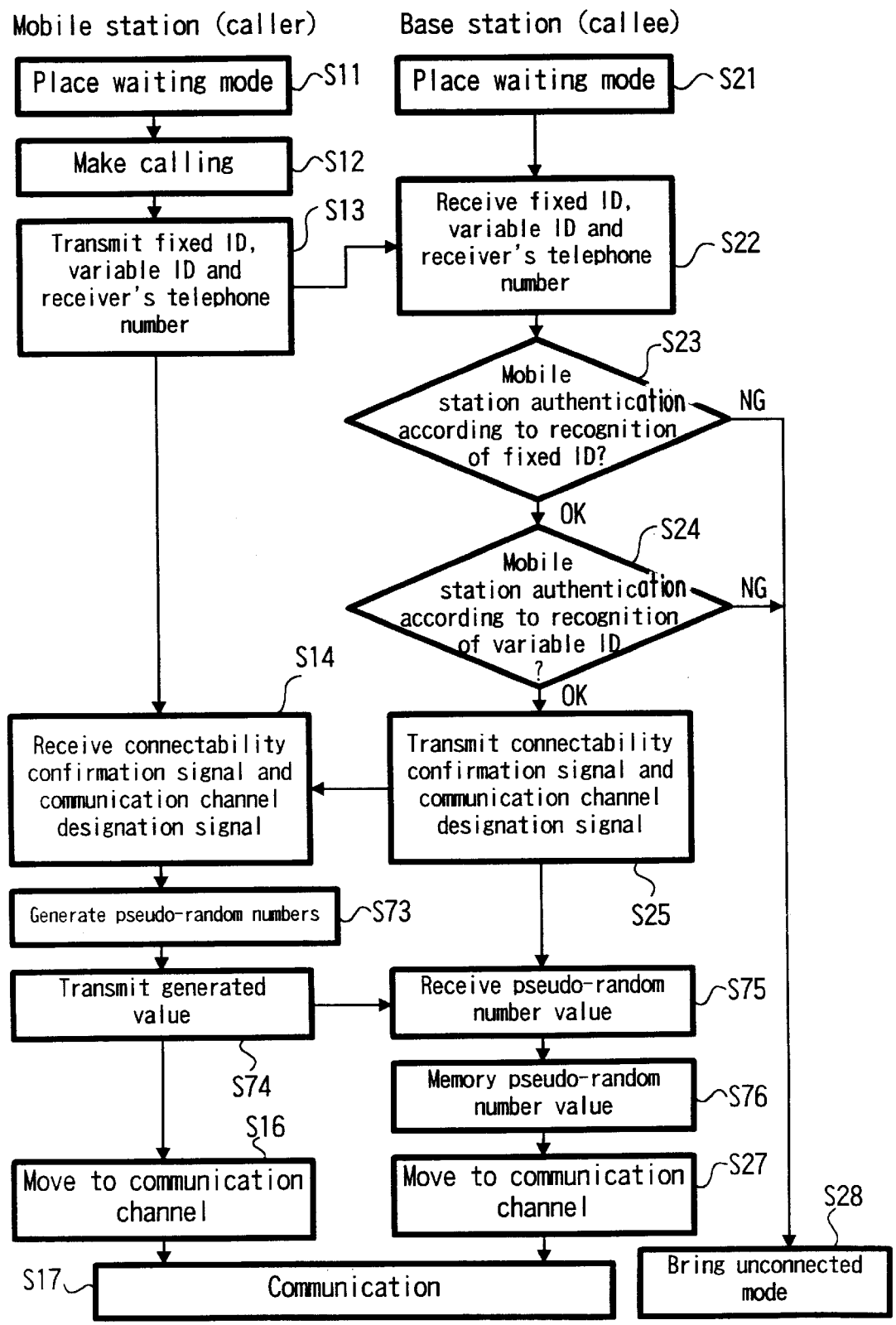
FIG. 12 is a flowchart showing a communication processing carried out by the fourth embodiment.

Next, a fourth embodiment of the present invention will be described with reference to FIG. 11 and FIG. 12. In FIG. 11 and FIG. 12, parts corresponding to those described as the prior art example of FIG. 1 and those described as the first, second and third embodiments of FIG. 2 to FIG. 10 are attached with the same reference numerals and they will not be described.

FIG. 11 is a diagram showing an arrangement of the communication system of the present example. Similarly to the above-described respective embodiments, the system serves as a radiophone system in which the mobile station 1 can carry out communication with a general subscriber's telephone 4 or other mobile station 2 through the telephone network 3 by means of radio communication with the base station 2.

In the present example, the mobile station 1 side is provided with a pseudo-random number counter 121 as a means for setting and holding the variable ID. The pseudo-random counter 121 is a counter for generating pseudo-random values (actually values changing with regularity) such as numbers of M-sequence or the like, for example. The telephone network 3 side is not provided with the counter, but the variable ID memory unit 313 of the telephone network 3 is arranged to update the variable ID transmitted from the mobile station side at every unit of communication and store the same therein. Other arrangements are the same as those of the third embodiment. Therefore, the fixed ID memory unit 311, the ID comparing unit 312 and the variable ID memory unit 313 serve as the communication managing apparatus.

Next, processing carried out when communication is effected between the base station 2 and the mobile station 1 by the arrangement of FIG. 11 will be described. In this case, processing carried out up to the start of communication by calling from the mobile station 1 will be described with reference to a flowchart of FIG. 12. The following processings are carried out under control of the control unit 101 on the mobile station 1 side and under control of the control unit 201 on the base station 2 side.

Now, it is assumed that a calling operation, i.e., input of receiver's telephone number and transmitting operation, is carried out (step S12) when both of the mobile station 1 and the base station 2 are placed in a waiting mode (steps S11, S21). If such a calling operation is carried out, the fixed ID and the variable ID set in the self station and data of the telephone number of the self station and the receiver's telephone number are transmitted from the mobile station 1 to the base station 2 located in the area by use of a predetermined control channel (step S13).

When the base station 2 side receives the data (step S22), it reads out the fixed ID corresponding to the telephone number of the mobile station from the fixed ID memory unit 311 within the telephone network 3 and supplies the same to the ID comparing unit 312, and also supplies the received fixed ID to the ID comparing unit 312. The ID comparing unit 312 compares both the fixed IDs with each other to determine whether or not they are coincident to each other, whereby the control unit 201 carries out authentication processing (step S23). At this time, if they are not coincident to each other, it is determined that the mobile station is not authorized. Thus, the mobile station 1 is prohibited from being connected to the network (step S28).

If it is determined that both the fixed IDs are coincident with each other in step S23, the variable ID corresponding to the telephone number of the mobile station is read out from the variable ID memory unit 313 within the communication network 3 and supplied to the ID comparing unit 312, and the received variable ID is supplied to the ID comparing unit 312. The ID comparing unit 312 compares both the variable IDs with each other to determine whether or not they are coincident with each other, whereby the control unit 201 carries out authentication processing (step S24). Also at this time, if they are not coincident to each other, it is determined that the mobile station is not authorized. Thus, the mobile station 1 is prohibited from being connected to the network (step S28).

If it is determined that the variable IDs are coincident with each other in step S24, a connectability confirmation signal and a communication channel designation signal are transmitted from the base station 2 to the corresponding mobile station 1 by use of a predetermined control channel (step S25). When the mobile station 1 receives the signals (step S14), pseudo-random numbers for the next stage are generated by the incorporated pseudo-random number counter 121 (step S73). Then, the generated values of pseudo-random numbers are transmitted as a variable ID to the base station 2 by use of a predetermined channel (step S74). When the base station 2 receives the variable ID (step S75), it memorizes the received variable ID in the variable ID memory unit 313 in the telephone network 3 (step S76).

On the mobile station 1 side, communication is carried out through a communication channel designated in step S14 (step S16). Further, after the variable ID is stored in the variable ID memory unit 313, the base station 2 side carries out communication through the designated communication channel (step S27). Thus, communication is carried out between the mobile station 1 and the base station 2 through the communication channel, so that communication is started between the connected receiver and the mobile station 1 through the base station 2 (step S17).

Since the processings of the fourth embodiment are carried out as above, the pseudo-random number counter, which serves as a means for generating a new variable ID, may be provided only in each terminal side serving as the mobile station. Therefore, the communication managing side need not generate a new variable ID, and the system can be simply arranged accordingly. Moreover, the variable ID apparently changes at random in the present example, and hence the identification data can be effectively prevented from being read.

While the flowchart of FIG. 12 has been described in connection to the operation upon calling from the mobile station, if the mobile station serves as a callee side, the variable ID updated by the pseudo-random counter 121 of the mobile station side may be similarly transmitted to and stored in the base station 1 side before starting communication.

Further, while in this example data of the updated variable ID itself is transmitted from the mobile station to the base station in a wireless fashion, difference data of the variable ID before update and the variable ID after update may be transmitted. Furthermore, the data may be transmitted after some encryption.

While in the example of FIG. 11 and FIG. 12 the counter is provided only on the side of the mobile station 1, the pseudo-random number counter for generating an updated variable ID may be provided on only the side of the telephone network 3, and before communication is started, the variable ID may be transmitted from the base station 2 to the mobile station 1 in a wireless fashion and then stored in the variable ID memory unit in the mobile station 1. Since the updated ID is generated on the telephone network side, the update of the ID is carried out under control of the communication managing center side. Therefore, the updated values of the variable ID or the like can be managed intensively, each terminal side need not be provided with a circuit (pseudo-random number counter) for generating the ID, and the terminal can be simply arranged.

Further, if the means for generating the updated variable ID is provided only on the communication managing side on the mobile station side like the fourth embodiment, instead of the above-described pseudo-ransom number counter a means for generating perfect random numbers may be provided as the variable ID generating means. If the arrangement is made as above, the variable ID changes based on random numbers without any regularity at all, and the identification data can be more effectively prevented from being read.

Figure 13:
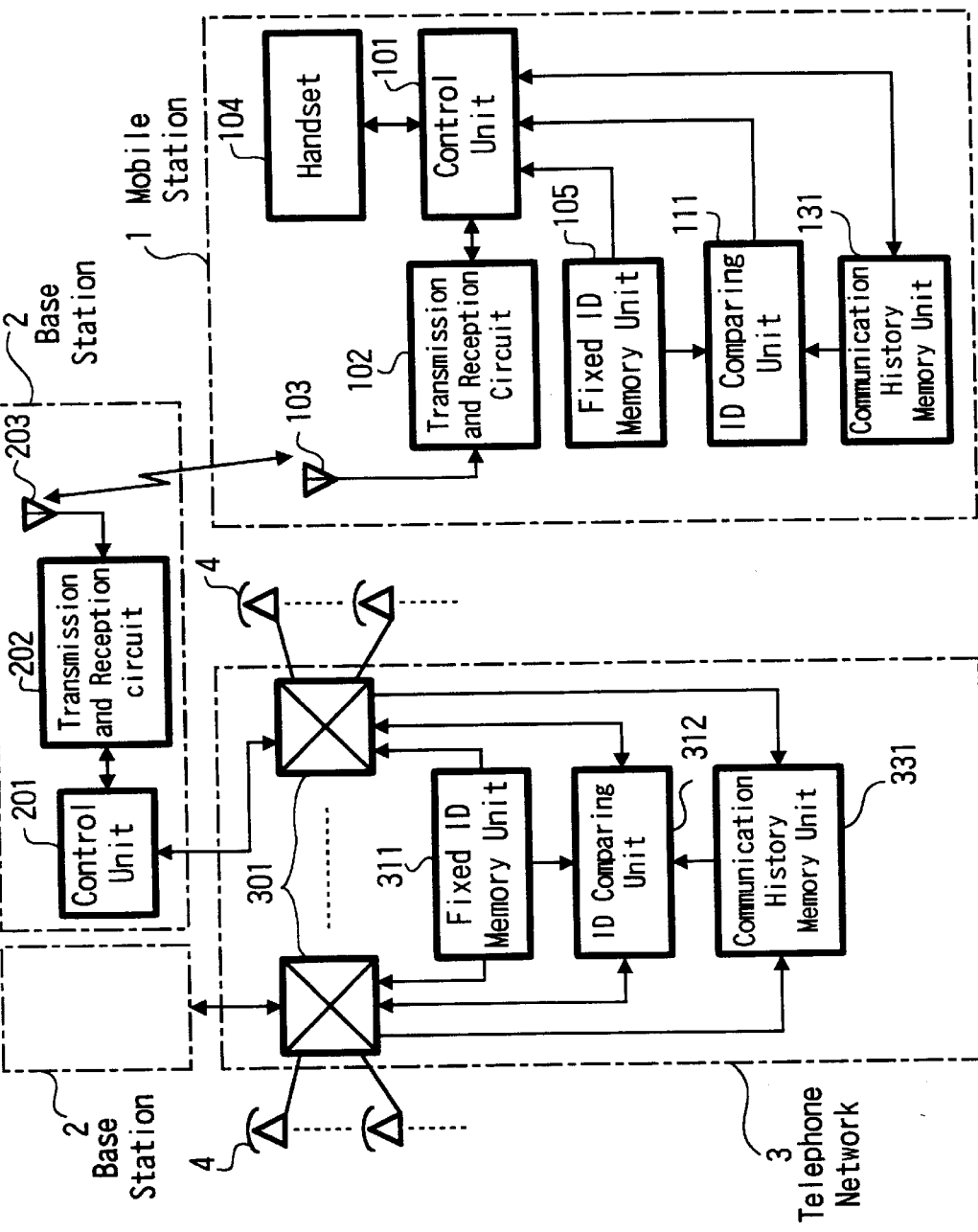
FIG. 13 is a diagram showing an arrangement of a communication system to which a fifth embodiment of the present invention is applied.
Figure 14:
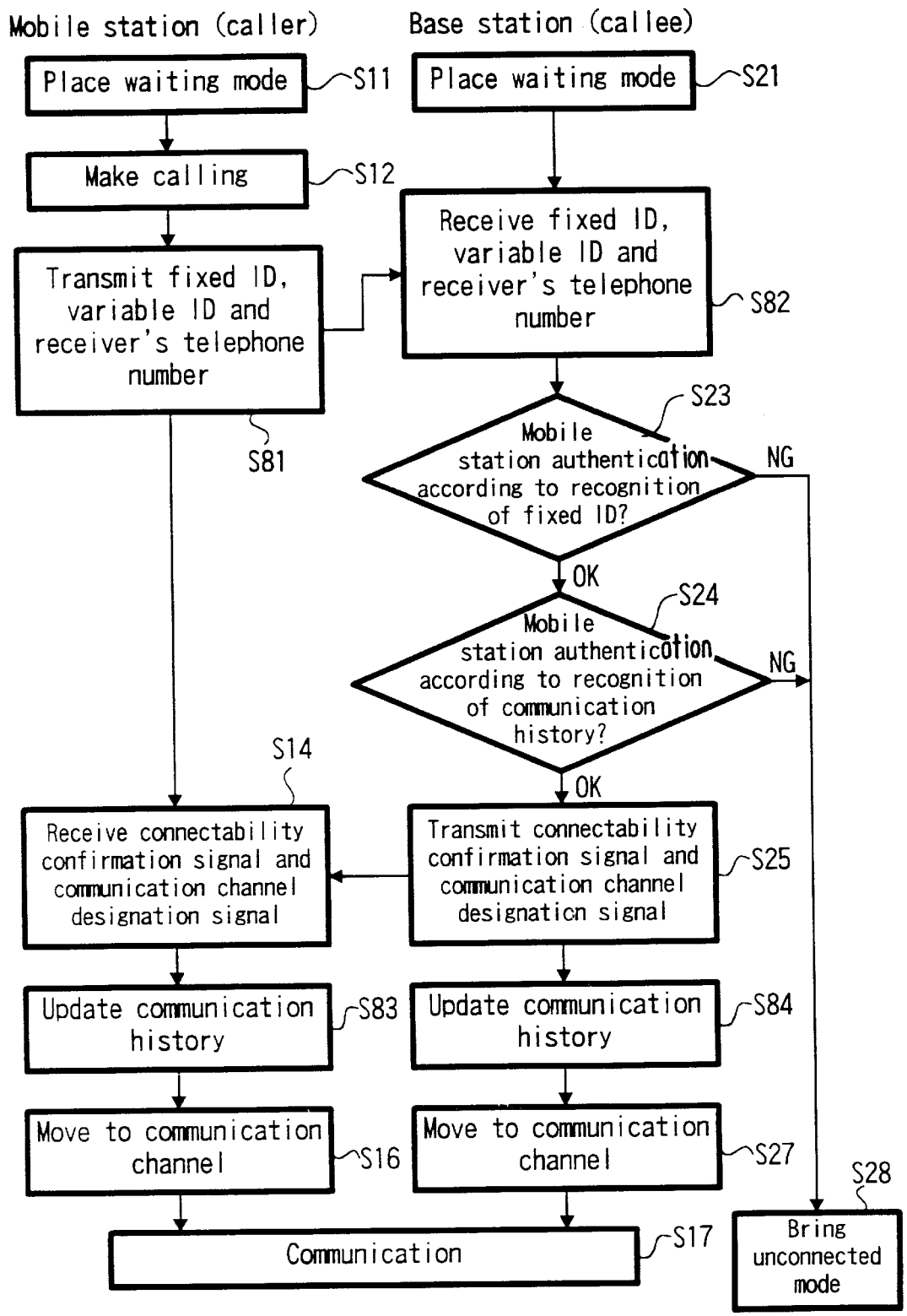
FIG. 14 is a flowchart showing a communication processing carried out by the fifth embodiment.

Next, a fifth embodiment of the present invention will be described with reference to FIGS. 13 and 14. In FIG. 13 and FIG. 14, parts corresponding to those described as the prior art example of FIG. 1 and those described as the respective embodiments of FIGS. 2 through 12 are attached with the same reference numerals and they will not be described in detail.

FIG. 13 is a diagram showing an arrangement of the communication system of the present example. Similarly to the above-described first embodiment, the system serves as a radiophone system in which the mobile station 1 can carry out communication with a general subscriber's telephone 4 or other mobile station 2 through the telephone network 3 by means of radio communication with the base station 2. The fundamental arrangement thereof is the same as that of the first embodiment described with FIG. 2.

In the present embodiment, the mobile station 1 is provided with a communication history memory unit 131 instead of the counter and the telephone network 3 side is provided with a communication history memory unit 331 instead of the counter and the variable ID memory unit. In this case, the communication history memory unit 131 of the mobile station 1 is arranged to memorize its own communication history (a telephone number, a communication start time, communication time or the like utilized for past communication) in a predetermined manner, and the communication history memory unit 331 of the telephone network 3 side is arranged to memorize communication histories of all mobile stations (telephone numbers, communication start times, communication times or the like utilized for past communication) in a predetermined manner. Predetermined data of the communication history (e.g., a telephone number of the preceding opponent, a communication start time, a communication time or the like) is utilized as a variable ID. Other arrangements are the same as those of the first embodiment. Therefore, the fixed ID memory unit 311, the ID comparing unit 312 and the communication history memory unit 331 serve as the communication managing apparatus.

Next, processing carried out when communication is effected between the base station 2 and the mobile station 1 by the arrangement of FIG. 13 will be described. In this case, processing carried out up to the start of communication by calling from the mobile station 1 will be described with reference to a flowchart of FIG. 14. The following processings are carried out under control of the control unit 101 on the mobile station 1 side and under control of the control unit 201 on the base station 2 side.

Now, it is assumed that a calling operation, i.e., input of a receiver's telephone number and transmitting operation, is carried out (step S12) when both the mobile station 1 and the base station 2 are placed in a waiting mode (steps S11, S21). If a calling operation is carried out, communication history data utilized as the fixed ID set in the self station and the variable ID and data of the telephone number of the self station and the receiver's telephone number are transmitted from the mobile station 1 to the base station 2 located in the area by use of a predetermined control channel (step S81).

When the base station 2 side receives the data (step S82), it reads out the fixed ID corresponding to the telephone number of the mobile station from the fixed ID memory unit 311 within the communication network 3 and supplies the same to the ID comparing unit 312, and also supplies the received fixed ID to the ID comparing unit 312. The ID comparing unit 312 compares both the fixed IDs with each other to determine whether or not they are coincident to each other, whereby the control unit 201 carries out authentication processing (step S23). At this time, if they are not coincident to each other, it is determined that the mobile station is not authorized. Thus, the mobile station 1 is prohibited from being connected to the network (step S28).

If it is determined that both the fixed IDs are coincident with each other in step S23, the communication history corresponding to the telephone number of the mobile station is read out from the communication history memory unit 331 within the communication network 3 and then supplied to the ID comparing unit 312, and the received communication history is supplied to the ID comparing unit 312. The ID comparing unit 312 compares both the communication histories with each other to determine whether or not they are coincident with each other, whereby the control unit 201 carries out authentication processing (step S24). Also at this time, if they are not coincident to each other, it is determined that the mobile station is not authorized. Thus, the mobile station 1 is prohibited from being connected to the network (step S28).

If it is determined that the communication histories are coincident with each other in step S24, a connectability confirmation signal and a communication channel designation signal are transmitted from the base station 2 to the corresponding mobile station 1 by use of a predetermined control channel (step S25). When the mobile station 1 receives the signals (step S14), the current communication history is stored in the incorporated communication history memory unit 131 to update the memory data (step S83), and thereafter communication is carried out through the designated communication channel (step S16). Further, after the communication channel designation signal is transmitted, the base station 2 side stores the current communication history into the communication history memory unit 331 on the side of the telephone network 3 to update the memory data (step S84), and thereafter communication is carried out through the designated communication channel (step S27). Thus, communication is carried out between the mobile station 1 and the base station 2 through the communication channel, so that communication is started between the connected receiver and the mobile station 1 through the base station 2 (step S17).

Since the processings of the fifth embodiment are carried out as above, the variable ID set for each mobile station is made by use of the communication history. Therefore, each terminal has a different communication history and hence each terminal has a different variable ID set therein each time the terminal carries out communication. Accordingly, a data generating means such as a random-number generating means or the like exclusively useful for generating identification data need not be provided, and a complicated variable ID that is very difficult to be read can be produced.

While the flowchart of FIG. 14 has been described in connection to the operation upon calling from the mobile station, when the mobile station serves as a callee side, the communication history may be updated before starting communication.

While in the above-described respective embodiments a value of a new variable ID is set to both the mobile station and the communication managing apparatus side before communication is started, it may be set after communication is finished, for example.

Further, while in the above respective embodiments the variable ID to be stored in the variable ID memory unit of the telephone network 3 side is controlled under the control of the control unit 201 provided in the base station 2, the variable ID may be set not under the control of the base station 2 but under the control of the communication control means (communication managing center) side present anywhere on the telephone network 3 side.

In the above respective embodiments, when a calling is made from the radio communication terminal, the fixed ID data and the variable ID data are read out on the basis of a telephone number transmitted from the radio communication terminal. However, the variable ID data may be read out on the basis of the fixed data after a match between the fixed data is confirmed.

Further, when the calling is made from the radio communication terminal, it is examined whether or not fixed ID data transmitted from the radio communication terminal is registered in the fixed ID data memory unit in the communication managing center. Then if it is confirmed that the transmitted fixed ID data is registered, then the variable ID data may be read out based on the fixed ID data.

Further, while in the above respective embodiments the present invention is applied to a radio communication system utilizing a portable telephone set, it is needless to say that the present invention can be applied to a communication system utilizing another communication terminal. In this case, the present invention can be applied not only to the system in which the base station is provided and communication is carried out between the base station and the terminal as in the above respective embodiments but to a system in which communication is carried out between terminals. In this case, at least either of the terminals should be provided with the function of the above-described base station to achieve the communication.

Furthermore, while in the above embodiments the present invention is applied to the radio communication system, the present invention can be applied to a communication system in which a connection is achieved by a wire network.

According to the communication method of the present invention, the identification data is updated to new data at every communication carried out with the mobile station. Therefore, even if the identification data is illegally deciphered, it becomes difficult to carry out communication illegally by using the identification data illegally deciphered. Accordingly, illegal utilization of the communication terminal can be effectively prevented.

Further, for the updating processing of the identification data in this case, either the mobile station or the communication managing center generates new identification data and transmits the generated identification data to the other station or center. Therefore, the updating means for the identification data may be provided only at the station or the center, and the updated identification data can be made coincident at both of the mobile station and the communication managing center with ease.

Further, for the updating processing of the identification data in the above communication method, both of the mobile station and the communication managing center generate new identification data and store the generated identification data in the respective holding means. Therefore, the identification data can be updated with new data without transmitting the updated identification data or the like. Accordingly, there is very little chance for the updated identification data to be leaked to the outside, and the identification data will function effectively in a particular system.

Further, for the updating processing of the identification data in the above communication method, at least either the mobile station or the communication managing center generates new identification data by changing in a sequential fashion. Therefore, the identification data can be updated by a relatively simple processing.

Further, for the updating processing of the identification data in the above communication method, at least either the mobile station or the communication managing center generates pseudo-random numbers and then generates identification data based on the pseudo-random numbers. Therefore, the identification data apparently seems to change at random, and hence the identification data can be effectively prevented from being deciphered.

Further, as the updating processing of the identification data in the above communication method, either the mobile station or the communication managing center generates identification data based on the generated pseudo-random numbers and then transmits the identification data to the other. Therefore, the identification data changes completely at random based on the pseudo-random numbers, and hence the identification data can be more effectively prevented from being deciphered.

Further, as the updating processing of the identification data in the above communication method, the new identification data is generated based on data relating to communication history. Therefore, each terminal comes to have different communication history, and the identification data of each terminal will change to different identification data at every communication carried out by the terminal. Accordingly, it becomes very difficult to decipher the identification data.

According to the communication system of the present invention, the identification data held by the respective holding means is updated with new data at every communication carried out between the base station and the mobile station. Therefore, even if the identification data is illegally deciphered, it becomes difficult to carry out communication illegally by using the identification data illegally deciphered. Accordingly, it is possible to provide a communication system capable of effectively preventing the communication terminal from being utilized illegally.

Further, in the case of the communication system, the updating means provided in either the base station controlling side or the mobile station generates new identification data and holds the new identification data in the holding means provided in its own station, and transmits the identification data to the opponent by means of communication between the base station and the mobile station to be held therein. Therefore, the updating means for the identification data may be provided only at either of the stations, and it is possible to provide a system in which the updated identification data can be made coincident at both of the mobile station and the communication managing center with ease.

Further, in the case of the above communication system, both the base station controlling side and the mobile station are provided with the updating means, new identification data is generated by each of the updating means and the generated identification data is held in each of the holding means. Therefore, the identification data can be updated with new data without transmitting the updated identification data or the like. Accordingly, there is very little chance for the updated identification data to be leaked to the outside, and the identification data will function effectively in the corresponding communication system.

Further, in the case of the above communication system, the updating means is formed of the counter which generates identification data changing in a sequential fashion. Therefore, the updating means can be realized by a simple arrangement employing the counter.

Further, in the case of the above communication system, the updating means is formed of the pseudo-random number generating means which generates pseudo-random numbers in a predetermined sequence. Therefore, the identification data apparently seems to change at random, and hence it is possible to provide a communication system which effectively prevents the identification data from being deciphered.

Further, in the case of the above communication system, the updating means is formed of the random number generating means which generates random numbers with no regularity in a generating order. Therefore, the identification data changes completely at random based on the pseudo-random numbers, and hence it is possible to provide a communication system which more effectively prevents the identification data from being deciphered.

Further, in the case of the above communication system, the updating means is formed of the means for generating the new identification data based on data relating to communication history. Therefore, each terminal comes to have different communication history, and the identification data of each terminal will change to different identification data at every communication carried out by the terminal. Accordingly, it is possible to produce complicated identification data that is very difficult to be deciphered without a data generating means such as a pseudo-random number generating means which is exclusively useful for generating identification data.

According to the present invention, the communication terminal is equipped with the updating means for updating identification data. Therefore, even if the identification data is illegally deciphered, it becomes difficult to continue the illegal utilization by using the identification data illegally deciphered because the identification data of the terminal is updated successively. Accordingly, the communication terminal will function as a terminal equipped with identification data of high secrecy.

Further, in the case of the above communication terminal, the updating means is formed of the counter which generates identification data changing in a sequential fashion. Therefore, the updating means can be realized by the counter with a simple arrangement.

Further, in the case of the above communication terminal, the updating means is formed of the pseudo-random number generating means which generates pseudo-random numbers in a predetermined sequence. Therefore, the identification data apparently seems to change at random, and hence it is possible to provide a communication terminal which effectively prevents the identification data from being deciphered.

Further, in the case of the above communication terminal, the updating means is formed of the random number generating means which generates random numbers with no regularity in a generating order. Therefore, the identification data changes completely at random based on the pseudo-random numbers, and hence it is possible to provide a communication terminal which more effectively prevents the identification data from being deciphered.

Further, in the case of the above communication terminal, the updating means is formed of the means for generating the new identification data based on data relating to communication history. Therefore, each terminal comes to have different communication history, and the identification data of each terminal will change to different identification data at every communication carried out by the terminal. Accordingly, it is possible to produce complicated identification data that is very difficult to be deciphered without a data generating means such as a pseudo-random number generating means which is exclusively useful for generating identification data or the like.

Further, in the case of the above communication terminal, the updating means is formed of the means for generating the new identification data based on data transmitted from the side of the communication opponent. Therefore, it is unnecessary for the terminal side to generate data which serves as a source for generating new identification data. Accordingly, the terminal can update the identification data therein with ease.

According to the present invention, the communication managing apparatus is equipped with the updating means for updating identification data. Therefore, even if the identification data is illegally deciphered, it becomes difficult to continue the illegal utilization by using the identification data illegally deciphered because the identification data of the terminal is updated successively. Accordingly, the identification data can be effectively kept secret upon managing the communication.

Further, in the case of the above communication managing apparatus, the updating means is formed of the counter which generates identification data changing in a sequential fashion. Therefore, the updating means can be realized by the counter with a simple arrangement.

Further, in the case of the above communication managing apparatus, the updating means is formed of the pseudo-random number generating means which generates pseudo-random numbers in a predetermined sequence. Therefore, the identification data apparently seems to change at random, and hence it is possible to manage communication while effectively preventing the identification data from being deciphered.

Further, in the case of the above communication managing apparatus, the updating means is formed of the random number generating means which generates random numbers with no regularity in a generating order. Therefore, the identification data changes completely at random based on the random numbers, and hence it is possible to manage communication while more effectively preventing the identification data from being deciphered.

Further, in the case of the above communication managing apparatus, the updating means is formed of the means for generating the new identification data based on data relating to communication history. Therefore, it is possible to produce complicated identification data that is very difficult to be deciphered without a data generating means such as a pseudo-random number generating means which is exclusively useful for generating identification data or the like, and hence it is possible to manage communication while effectively preventing illegal utilization.

Further, in the case of the above communication managing apparatus, the updating means is formed of the means for generating the new identification data based on data transmitted from the corresponding communication terminal. Therefore, it is unnecessary for the communication managing apparatus side to generate data which serves as a source for generating new identification data. Accordingly, the communication managing apparatus can update the identification data therein with ease.

Furthermore, in the case of the above communication managing apparatus, either of the communication terminals is provided with the communication managing apparatus so that communication can be carried out between communication terminals under control of the communication managing apparatus that is provided in that communication terminal. Therefore, the present invention can be applied to the authentication processing for each terminal when communication is carried out directly among a plurality of communication terminals.

Having described the preferred embodiments of the invention with reference to the accompanying drawings, it is to be understood that the invention is not limited to that precise embodiments and these various changes and modifications could be effected therein by one skilled in the art without departing from the spirit or scope of the invention as defined in the appended claims.

What is claimed is:

1. An authentication method for a radio communication system including a plurality of base stations, a plurality of radio communication terminals, wherein each of said plurality of radio communication terminals is capable of communicating with each of said plurality of base stations, and a telephone network having a plurality of exchangers connected to said plurality of base stations and a communication managing apparatus for controlling said plurality of exchangers connected to said plurality of base stations, comprising the steps of:

storing identification data in each of said plurality of radio communication terminals, wherein said identification data is different for each of said plurality of radio communication terminals;

storing said identification data for each of said plurality of radio communication terminals permitted to access said radio communication system in said communication managing apparatus;

determining whether the identification data stored in one of said plurality of radio communication terminals requesting a connection to said telephone network through one of said plurality of base stations coincides with any of said identification data of said plurality of radio communication terminals which are permitted to access said radio communication system stored in said communication managing apparatus;

connecting one of said plurality of radio communication terminals to said telephone network upon confirming that the identification data stored in one of said plurality of radio communication terminals and said identification data stored in said communication managing apparatus coincide with each other; and updating the identification data of one of said plurality of radio communication terminals stored in one of said plurality of radio communication terminals and updating said identification data of said communication managing apparatus with new identification data before every connection made between one of said plurality of radio communication terminals and said telephone network, wherein said new identification data is data output from a counter.

2. The authentication method for a radio communication system as set forth in claim 1, wherein if one of said plurality of radio communication terminals makes a calling for connecting with said telephone network through one of said plurality of base stations, then said one of said plurality of radio communication terminals transmits said identification data and a telephone number stored in said one of said plurality of radio communication terminals to said communication managing apparatus, and said communication managing apparatus reads said identification data stored in said communication managing apparatus that corresponds to said telephone number, whereby it is determined whether said identification data transmitted by said one of said plurality of radio communication terminals coincides with said identification data read from said communication managing apparatus.

3. The authentication method for a radio communication system as set forth in claim 1, wherein if one of said plurality of radio communication terminals is called for connecting with said telephone network through one of said plurality of base stations, then said communication managing apparatus reads said identification data stored in the communication managing apparatus that corresponds to a telephone number of said one of said plurality of radio communication terminals and transmits the read identification data to said one of said plurality of radio communication terminals, whereby it is determined whether said read identification data transmitted by the communication managing apparatus coincides with said identification data stored in said one of said plurality of radio communication terminals.

4. The authentication method for a radio communication system as set forth in claim 1, wherein when said identification data is updated, one of said communication managing apparatus and one of said plurality of radio communication terminals generates said new identification data, stores the new identification data in one of said communication managing apparatus or one of said plurality of radio communication terminals, and transmits the new identification data to one of said communication managing apparatus or one of said plurality of radio communication terminals that did not perform said updating.

5. The authentication method for a radio communication system as set forth in claim 1, wherein when said identification data is updated, one of said plurality of radio communication terminals and said communication managing apparatus generate said new identification data that is identical and store the new identification data in one of said plurality of radio communication terminals and said communication managing apparatus.

6. The authentication method for a radio communication system as set forth in claim 4, wherein said new identification data is generated by varying a count of a counter.

7. The authentication method for a radio communication system as set forth in claim 5, wherein said new identification data is generated by varying a count of a counter.

8. The authentication method for a radio communication system as set forth in claim 4, wherein said new identification data is generated by pseudo-random number generating means for generating random numbers in a regular order.

9. The authentication method for a radio communication system as set forth in claim 5, wherein said new identification data is generated by pseudo-random number generating means for generating random numbers in a regular order.

10. The authentication method for a radio communication system as set forth in claim 4, wherein said new identification data is generated based on data relating to a communication history of one of said plurality of radio communication terminals.

11. The authentication method for a radio communication system as set forth in claim 5, wherein said new identification data is generated based on data relating to a communication history of one of said plurality of radio communication terminals.

12. The authentication method for a radio communication system as set forth in claim 4, wherein said new identification data is generated by random number generating means for generating random numbers in a random order.

13. A radio communication system comprising:

a plurality of base stations;

a plurality of radio communication terminals, each for communicating with each of said plurality of base stations; and a telephone network having a plurality of exchangers connected to said plurality of base stations and a communication managing apparatus for controlling said plurality of exchangers connected to said plurality of base stations, wherein each of said plurality of radio communication terminals has first memory means for storing therein identification data that is different for each of said plurality of radio communication terminals, said communication managing apparatus has second memory means for storing therein said identification data of said plurality of radio communication terminals permitted to access said telephone network, and one of said communication managing apparatus and each of said plurality of radio communication terminals has comparing means for detecting whether the identification data stored in said first memory means of one of said plurality of radio communication terminals coincides with said identification data stored in said second memory means of said communication managing apparatus, connection control means for connecting said plurality of radio communication terminals to said telephone network when said comparing means determines that said identification data stored in said first memory means of one of said plurality of radio communication terminals coincides with said identification data stored in said second memory means of said communication managing apparatus, and updating means including a counter for updating the identification data stored in said first memory means of one of said plurality of radio communication terminals and updating said identification data stored in said second memory means of said communication managing apparatus before every connection made between one of said plurality of radio communication terminals and said telephone network with new identification data, wherein said new identification data is data output from said counter.

14. The radio communication system as set forth in claim 13, wherein one of each of said plurality of radio communication terminals and said communication managing apparatus has said updating means, generates said identification data by said updating means, stores the identification data in one of said first memory means of one of said plurality of radio communication terminals and said second memory means of said communication managing apparatus, respectively, and transmits the identification data to one of said plurality of radio communication terminals or said communication managing apparatus that does not have said updating means for storing the identification data in one of the first memory means and said second memory means.

15. The radio communication system as set forth in claim 13, wherein said plurality of radio communication terminals and said communication managing apparatus have said updating means and generate said identification data by the updating means, and whereby said plurality of radio communication terminals store the identification data in the first memory means and said communication managing apparatus stores said identification data in said second memory means.

16. The radio communication system as set forth in claim 14, wherein said updating means includes pseudo-random number generating means for generating random numbers in a regular order.

17. The radio communication system as set forth in claim 15, wherein said updating means includes pseudo-random number generating means for generating random numbers in a regular order.

18. The radio communication system as set forth in claim 14, wherein said updating means includes communication history memory means for storing therein data relating to a communication history of one of said plurality of radio communication terminals.

19. The radio communication system as set forth in claim 15, wherein said updating means includes communication history memory means for storing therein data relating to a communication history of one of said plurality of radio communication terminals.

20. The radio communication system as set forth in claim 14, wherein said updating means includes random number generating means for generating random numbers in a random order.

21. A radio communication terminal of a radio communication system including a plurality of base stations, a plurality of radio communication terminals, each for communicating with each of said plurality of base stations, and a telephone network having a plurality of exchangers connected to said plurality of base stations and a communication managing apparatus for controlling said plurality of exchangers connected to said plurality of base stations, comprising:

memory means for storing therein identification data; and updating means including a counter for updating said identification data stored in said memory means before every connection made between one of said plurality of radio communication terminals and said telephone network with new identification data, wherein said new identification data is data output from said counter.

22. The radio communication terminal as set forth in claim 21, further comprising:

comparing means for detecting whether the identification data stored in said memory means coincides with identification data transmitted from one of said plurality of base stations; and communication control means for connecting said radio communication terminal to said telephone network upon said comparing means detecting that said identification data stored in said memory means coincides with said identification data transmitted from one of said plurality of base stations.

23. The radio communication terminal as set forth in claim 21, wherein said updating means includes pseudo-random number generating means for generating random numbers in a predetermined order.

24. The radio communication terminal as set forth in claim 21, wherein said updating means includes communication history memory means for storing therein data relating to a communication history of said radio communication terminal.

25. The radio communication terminal as set forth in claim 21, wherein said updating means includes random number generating means for generating random numbers in a random order.

26. The radio communication terminal as set forth in claim 21, wherein said updating means generates new identification data based on data transmitted from one of said plurality of base stations.

27. A communication managing apparatus of a radio communication system including a plurality of base stations, a plurality of radio communication terminals, each for communicating with each of said plurality of base stations, and a telephone network having a plurality of exchangers connected to said plurality of base stations and a communication managing apparatus for controlling said plurality of exchangers connected to said plurality of base stations, comprising:

memory means for storing identification data for each of said plurality of radio communication terminals permitted to access said radio communication system; and updating means including a counter for updating said identification data stored in said memory means before every connection made between one of said plurality of radio communication terminals and said telephone network with new identification data, wherein said new identification data is data output from said counter.

28. The communication managing apparatus as set forth in claim 27, further comprising:

comparing means for detecting whether the identification data stored in said memory means coincides with identification data transmitted from one of said plurality of base stations; and communication control means for connecting one of said plurality of radio communication terminals to said telephone network upon said comparing means detecting that said identification data stored in said memory means coincides with said identification data transmitted from one of said plurality of base stations.

29. The communication managing apparatus as set forth in claim 27, wherein said updating means includes pseudo-random number generating means for generating random numbers in a predetermined order.

30. The communication managing apparatus as set forth in claim 27, wherein said updating means includes communication history memory means for storing therein data relating to a communication history of one of said plurality of radio communication terminals.

31. The communication managing apparatus as set forth in claim 27, wherein said updating means includes random number generating means for generating random numbers in a random order.

32. The communication managing apparatus as set forth in claim 27, wherein said updating means generates new identification data based on data transmitted from one of said plurality of base stations.

* * * * *